United States Patent
Mondal et al.

(10) Patent No.: US 9,122,588 B1
(45) Date of Patent: Sep. 1, 2015

(54) MANAGING ASYMMETRIC MEMORY SYSTEM AS A CACHE DEVICE

(71) Applicant: Virident Systems Inc., Milpitas, CA (US)

(72) Inventors: Shibabrata Mondal, Bangalore (IN); Vijay Karamcheti, Palo Alto, CA (US); Ankur Arora, Bangalore (IN); Ajit Yagaty, Bangalore (IN)

(73) Assignee: Virident Systems Inc., Milpitas, CA (US)

( * ) Notice: Subject to any disclaimer, the term of this patent is extended or adjusted under 35 U.S.C. 154(b) by 175 days.

(21) Appl. No.: 13/843,714

(22) Filed: Mar. 15, 2013

(51) Int. Cl.
*G06F 12/02* (2006.01)
*G11C 16/10* (2006.01)

(52) U.S. Cl.
CPC .................................. *G06F 12/0246* (2013.01)

(58) Field of Classification Search
None
See application file for complete search history.

(56) References Cited

U.S. PATENT DOCUMENTS

| | | | | |
|---|---|---|---|---|
| 5,276,835 A * | 1/1994 | Mohan et al. | | 711/144 |
| 5,734,861 A * | 3/1998 | Cohn et al. | | 711/160 |
| 5,787,466 A * | 7/1998 | Berliner | | 711/117 |
| 8,756,375 B2 * | 6/2014 | Flynn | | 711/128 |
| 2010/0070729 A1 * | 3/2010 | Ng et al. | | 711/166 |
| 2013/0297880 A1 * | 11/2013 | Flynn | | 711/128 |
| 2014/0068182 A1 * | 3/2014 | Terry | | 711/114 |

* cited by examiner

*Primary Examiner* — Daniel Bernard
(74) *Attorney, Agent, or Firm* — Fish & Richardson P.C.

(57) ABSTRACT

Some implementations provide a method for managing data in a storage system that includes a persistent storage device and a non-volatile random access memory (NVRAM) cache device. The method includes: accessing a direct mapping between a logical address associated with data stored on the persistent storage device and a physical address on the NVRAM cache device; receiving, from a host computing device coupled to the storage system, a request to access a particular unit of data stored on the persistent storage device; using the direct mapping as a basis between the logical address associated with the data stored on the persistent storage device and the physical address on the NVRAM cache device to determine whether the particular unit of data being requested is present on the NVRAM cache device.

22 Claims, 8 Drawing Sheets

MANAGING ASYMMETRIC MEMORY SYSTEM AS A CACHE DEVICE

TECHNICAL FIELD

This document generally relates to using an asymmetric memory system as a cache device.

BACKGROUND

Computer systems typically use memory modules for storing data. Some of the memory modules are realized by memory cards that include non-volatile computer memory, such as Flash memory.

SUMMARY

The present disclosure describes method and systems by which a non-volatile random access memory (NVRAM) device may be configured as a cache device in a NVRAM-based storage subsystem.

In one aspect, some implementations provide a method for managing data in a storage system that includes a persistent storage device and a non-volatile random access memory (NVRAM) cache device. The method includes: accessing a direct mapping between a logical address associated with data stored on the persistent storage device and a physical address on the NVRAM cache device; receiving, from a host computing device coupled to the storage system, a request to access a particular unit of data stored on the persistent storage device; using the direct mapping as a basis between the logical address associated with the data stored on the persistent storage device and the physical address on the NVRAM cache device to determine whether the particular unit of data being requested is present on the NVRAM cache device; in response to determining that the particular unit of data being requested is present on the NVRAM cache device, servicing the request by accessing a copy of the particular unit of data present on the NVRAM cache device; and in response to determining that the particular unit of data being requested is not present on the NVRAM cache device, servicing the request by accessing the particular unit of data stored on the persistent storage device.

Implementations may include one or more of the following features. The method may further include using a logical block address as the logical address to specify a logical location of the data stored on the persistent storage device; and using the physical address to identify a physical location on the NVRAM cache device where a copy of the data is stored. The method may additionally include formatting the logical block address (LBA) on a linear basis.

The method may further include: establishing the direct mapping between the logical address and the physical address by mapping from a logical address space into a physical address space, wherein the logical address is directed to the logical address space and the physical address is directed to the physical address space, and wherein the logical address space is larger than the physical address space. The method may additionally include indexing the logical address by using at least 32 bits. The method may further include performing the mapping from the logical address space to the physical address space by keying a hash to the logical address in the logical address space and equalizing probabilities of mapping a keyed logical address to physical addresses within the physical address space.

The method may further include: based on determining that the particular unit of data is present on the NVRAM cache device, ascertaining whether the copy of the particular unit of data present on the NVRAM cache device is in a non-updated state, wherein the copy of the particular unit of data present on the NVRAM cache device is in the non-updated state when the copy of the particular unit of data present on the NVRAM cache device is identical to the particular unit of data stored on the persistent storage device.

The method may further include: based on determining that the particular unit of data is present on the NVRAM cache device, ascertaining whether the copy of the particular unit of data present on the NVRAM cache device is in an updated state, wherein the copy of the particular unit of data present on the NVRAM cache device is in the updated state when the copy of the particular unit of the data present on the NVRAM cache device is more recent than the particular unit of data stored on the persistent storage device.

Receiving the request to access data stored on the persistent storage device may include receiving a read request. Receiving the request to access data stored on the persistent storage device may include receiving a write request. Receiving the request to access data stored on the persistent storage device may include receiving a garbage collection request.

The method may further include: in response to ascertaining that the copy of the particular unit of data present on the NVRAM cache device is in the non-updated state, determining at least one of: an access intensity of the copy of the particular unit of data present on the NVRAM cache device, or a ranking importance of the copy of the particular unit of data present on the NVRAM cache device; and deleting, and without writing to the persistent storage device, the copy of the particular unit of data present on the NVRAM cache device in response to determining that the access intensity of the copy of the particular unit of data present on the NVRAM cache device is within an access threshold or the ranking importance of the copy of the particular unit of data present on the NVRAM is below an importance threshold. The method may further include: deleting, and without writing to the persistent storage device, the copy of particular unit of data present on the NVRAM cache device in response to receiving the garbage collection request.

The method may further include: generating the garbage collection request by a write request from the host computing device when the NVRAM cache device does not have sufficient capacity to accommodate the write request. The method may further include: generating the garbage collection request by a background garbage collection process.

In another aspect, some implementations may include a NVRAM-based storage subsystem that includes: a persistent storage device; and a NVRAM cache device in communication with the persistent storage device. The NVRAM cache device includes flash memory media; and a controller in communication with a host computing device, the controller configured to: access a direct mapping between a logical address associated with data stored on the persistent storage device and a physical address on the NVRAM cache device; receive, from the host computing device, a request to access a particular unit of data stored on the persistent storage device; use the direct mapping as a basis between the logical address associated with the data stored on the persistent storage device and the physical address on the NVRAM cache device to determine whether the particular unit of data being requested is present on the NVRAM cache device; in response to determining that the particular unit of data being requested is present on the NVRAM cache device, service the request by accessing a copy of the particular unit of data present on the NVRAM cache device; and in response to determining that the particular unit of data being requested is not present on the NVRAM cache device, service the request by accessing the data stored on the persistent storage device.

Implementations may include one or more of the following features. The logical address comprises a logical block address (LBA) to specify a logical location of data stored on the persistent storage device; and wherein the physical address identifies a physical location on the NVRAM cache device where a copy of the data is stored. The logical block address (LBA) may be linear.

The logical address may be directed to a logical address space and the physical address may be directed to a physical address space, wherein the logical address space may be larger than the physical address space, and wherein the direct mapping may be from the logical address space into the physical address space. The logical address is indexed by at least 32 bits. The sparse mapping from the logical address space to the physical address space may be an association map based on a hash. The hash may be keyed to the logical address and may be configured to equalize probabilities of mapping a keyed logical address to physical addresses within the physical address space.

The persistent storage device may include a hard disk drive with a rotating arm, a redundant array of independent disks (RAID), a portion of a storage area network (SAN) or network area storage (NAS), or a solid state device (SSD) either on the host computing device or in a network appliance in connection with the host computing device. The Flash memory media may include any one of: NAND Flash memory media, NOR Flash memory media, SLC-type Flash memory media, or MLC-type Flash memory media.

The controller may be further configured to: in response to determining that the data is present on the NVRAM cache device, ascertain whether the copy of the particular unit of data present on the NVRAM cache device is in a non-updated state or in an updated state, wherein the copy of the particular unit of data present on the NVRAM cache device is in the non-updated state when the copy of the particular unit of data present on the NVRAM cache device is identical to the data stored on the persistent storage device, and wherein the copy of the particular unit of data present on the NVRAM cache device is in the updated state when the copy of the particular unit of data present on the NVRAM cache device is more recent than the data stored on the persistent storage device. The request to access data stored on the persistent storage device may include any one of: a read request, a write request, or a garbage collection request.

The controller may be further configured to: in response to ascertaining that the copy of the particular unit of data present on the NVRAM cache device is in the non-updated state, determine an access intensity of the copy of the particular unit of data present on the NVRAM cache device. The controller may be further configured to: in response to ascertaining that the copy of the particular unit of data present on the NVRAM cache device is in the non-updated state, determine a ranking importance of the copy of the particular unit of data present on the NVRAM cache device. The controller may be further configured to delete, and without writing to the persistent storage device, the copy of the particular unit of data present on the NVRAM cache device in response to determining that the access intensity of the copy of the particular unit of data present on the NVRAM cache device is within an access threshold. The controller may be further configured to delete, and without writing to the persistent storage device, the copy of the particular unit of data present on the NVRAM cache device in response to determining that the ranking importance of the copy of the particular unit of data present on the NVRAM is below an importance threshold.

The controller is further configured to: delete, and without writing to the persistent storage device, the copy of the particular unit of data present on the NVRAM cache device in response to receiving the garbage collection request. The garbage collection request may be generated by a write request from the host computing device when the NVRAM cache device does not have sufficient capacity to accommodate the write request. The garbage collection request may be generated by a back-ground garbage collection process.

In yet another aspect, some implementations include a NVRAM-based storage subsystem that includes: a persistent storage device; and a NVRAM cache device in communication with the persistent storage device. The NVRAM cache device includes: flash memory media; and a controller means for: accessing a direct mapping between a logical address associated with data stored on the persistent storage device and a physical address on the NVRAM cache device; receiving, from the host computing device, a request to access a particular unit of data stored on the persistent storage device; using the direct mapping as a basis between the logical address associated with the data stored on the persistent storage device and the physical address on the NVRAM cache device to determine whether the particular unit of data being requested is present on the NVRAM cache device; in response to determining that the particular unit of data being requested is present on the NVRAM cache device, servicing the request by accessing a copy of the particular unit of data present on the NVRAM cache device; and in response to determining that the particular unit of data being requested is not present on the NVRAM cache device, servicing the request by accessing the data stored on the persistent storage device.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1A:
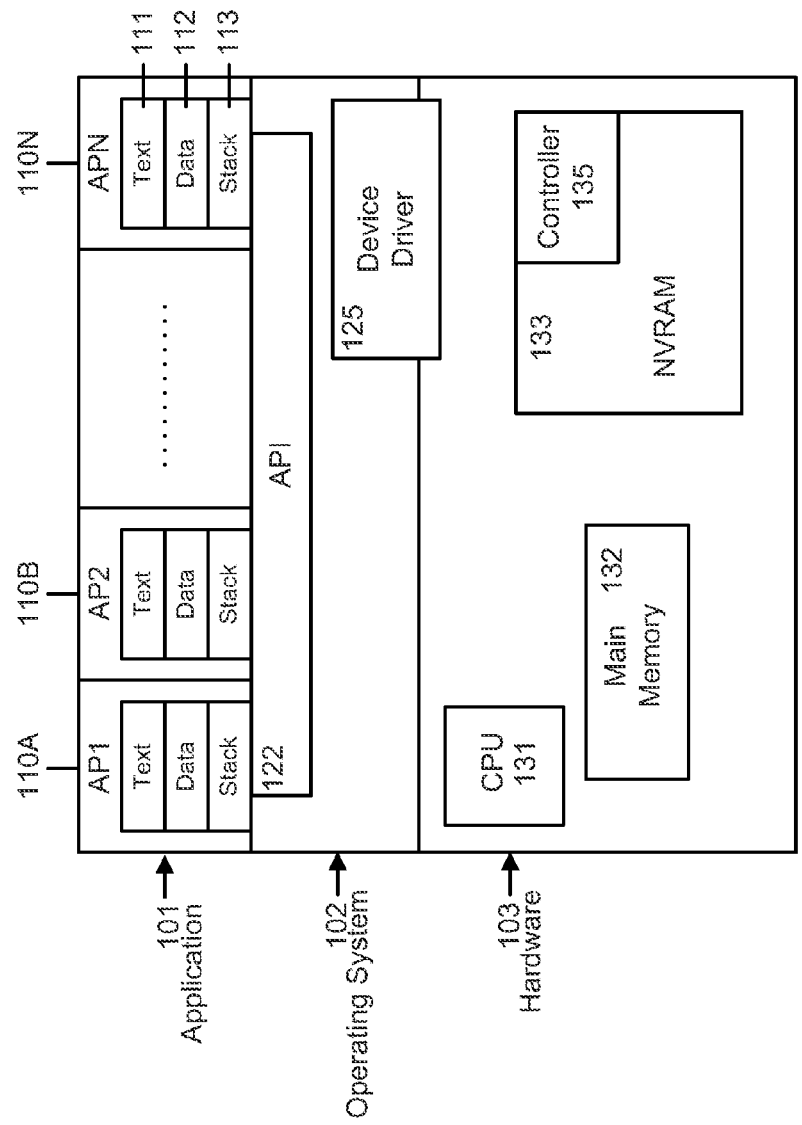
FIG. 1A is a diagram illustrating a host computing device and a NVRAM in accordance with some implementations.

Non-volatile memory devices, such as NOR and NAND flash devices, may be configured to act as storage-class devices used for enterprise data storage and Internet data center applications. Such data storage applications may include, for example, back-up file servers, large database applications to respond to user queries, distributed directory services to provide on-line white-page services, and other applications associated with cloud computing to provide some form of cloud service. In some data storage applications, the NOR and NAND flash devices may serve as adjuncts to mechanical rotating media storage devices.

In contrast to SRAM or DRAM, these non-volatile memory devices (NVMDs) do not require constant refresh currents to hold data contents stored on the flash media memory cells. For example, the NVMDs can hold data contents for decades without refresh currents. On the other hand, data contents stored on these NVMD devices may or may not be accessed using the same read and write access granularity as for other types of memory (such as volatile memory). Two types of flash memories have been mentioned above, namely NAND and NOR. These two types of flash memories have different underlying logic gate arrangement of each cell. NAND flash memory may be written and read in blocks (or pages) which are generally much smaller than the size of the entire device but substantially larger than a single byte. In comparison, NOR flash memory may allow a single machine word (byte) to be written or read independently. In addition, the NVMDs may include emerging types of memory, such as phase change memory.

On these NVMDs, the latency of each I/O operation may depend on the density or the processing technology of the non-volatile memory devices as well as the presence of a weakness (or degradation) in a particular region, as described below.

On these NVMDs, flash memory stores data in individual memory cells using floating-gate transistors. Various memory cell technologies have been developed, including, for example, single-level cell (SLC) and multi-level cell (MLC). A SLC may have two possible states and thus encode one bit of data. A "0" or "1" is determined by the threshold voltage Vt of the flash cell. The threshold voltage can be manipulated by the amount of charge put on the floating gate of the flash cell. A flash memory chip based on SLC memory cells may be referred to as a SLC flash memory. In comparison, an MLC may allow more bits to be stored using the same number of transistors per cell. A flash memory chip based on MLC memory cells may be known as MLC flash memory. Some MLC cells may encode two bits of information, namely "11", "10". "01" and "00". The encoding is determined by a finer division of the threshold voltage Vt range of a particular flash cell, which in turn is manipulated by the amount of charge put on the floating gate of the particular flash cell. Noteworthy is that some flash cells may encode more than 2 bits of information. In fact, some flash cells may encode, for example, 3 bits of information, by an even finer division of the threshold voltage range. This increased number of states reduces the amount of margin in threshold voltage that separates the encoded states. The reduced margin results in an increased occurrence of errors in I/O operations such as read and write on MLC flash memory than on SLC flash memory of comparable sizes. MLC flash memory designed for relatively low I/O error rates are sometimes called enterprise MLC (eMLC) flash memory.

The read speeds between SLC and MLC may be comparable. But write speeds may be different between SLC and MLC.

SLC flash memory may have the advantage of faster write speeds, lower power consumption and higher cell endurance. Due to faster transfer speeds and longer life, SLC flash technology is used in high-performance memory cards. However, because the SLC flash memory stores less data per cell, it costs more per megabyte of storage to manufacture.

In comparison, the main benefit of MLC flash memory may include its lower cost per unit of storage due to the higher data density. However, MLC flash memory may be more prone to I/O errors than SLC flash memory of comparable size. More sophisticated error detection and correction algorithms may be relied on to handle these I/O errors. Other drawbacks of MLC flash memory may include lower write and erase speeds, lower number of program-erase cycles and higher power consumption compared to SLC flash memory of comparable size.

Thus, SLC flash memory tends to provide faster memory access than MCL flash memory of a comparable size. However, SLC devices generally provide smaller capacity per unit cost than a comparable MLC device. A MLC device may experience noisier I/O characteristics relative a SLC in terms of increased likelihood of I/O errors.

Once a particular type of NVMD has been configured as a storage-class device, the performance of these non-volatile memory devices may be operation-specific. As used herein for this application, these non-volatile memory devices adapted for storage-class applications may be referred to as non-volatile random access memories (NVRAMs) to differentiate from dynamic random-access memory (DRAM) and hard disk devices (HDD) that do not provide random access to memory, only serialized storage in cylinders, headers, and sections accessible through mechanical rotating and scanning arm(s). In this context, NVRAM and NVMD may be used interchangeably in this application.

The NVRAM device may perform certain classes of memory operations (e.g., read operations) much faster (e.g., more than one hundred times faster than hard disk devices having rotating disks and an array of mechanical arms to access a particular cylinder, header, or segment of the rotating disks). Nonetheless, the non-volatile memory devices may have physical limitations that result in other memory operations that are not only slower than operations associated with dynamic random access memory (DRAM), but also slower than other NVRAM operations. For example, write and erase operations of a NVRAM device may be much slower than read operations on the NVRAM devices. This asymmetry in I/O access time is known as an asymmetry characteristic of the NVRAM devices. Furthermore, the I/O operations may have different minimal data sizes. For example, erase operations may be performed per erase block, write operations may be performed per write page, and read operations may be performed per read page. One erase block may be the size of several write pages. One write page may be the size of several read pages.

In addition, the NVRAM may have certain "wear" characteristics that result in degraded performance over time, particularly as more write and erase operations are performed. In simple terms, weaker (or degraded) regions of the NVRAM device may develop (or increase) over time. The weaker (or degraded) regions of the NVRAM device may have I/O performances worse than other areas of flash memory on the NVRAM device. For example, weaker regions of the NVRAM device may exhibit slower read, write, or erase speed, higher error rate, etc. The weaker regions of the NVRAM device may have I/O performances worse than certain preferred values, which may be proprietary numbers heuristically set by the manufacturer, or standard numbers set forth in industry-wide guidelines. For example, weaker regions of the NVRAM device may have flash memory media with read, write, or erase speed lower than the recommended values, or more prone to encounter errors during read, write, or erase operations. Each NVRAM device may have an expected durability as weaker regions develop or increase in size. Further, each NVRAM device may have inherent manufacturing imperfections, manifested by weaker regions, when shipped to downstream integrators or customers. In the presence of weaker regions of the flash media, data integrity as well as data access speed need to be maintained. At the same time, I/O operations may be performed at various granularities, depending, in part, on the underlying flash media type. For NAND type memory media, read and write operations may be performed at a granularity of, for example, pages (also known as blocks) of, for example, 2 k to 16 k bytes at a time. For NOR type memory media, the read and write operations may be performed at the granularity of each byte. The apparent performance of reading/writing a particular data size on a flash media depends on the granularity of the I/O operation to execute the read/write operation, and hence depends on the processing technology of the underlying flash memory media.

Multiple NVRAM devices may be included in an NVRAM-based storage subsystem. The NVRAM-based storage subsystem may employ multiple levels of controllers to coordinate operations among each individual NVRAM device. Such NVRAM-based storage subsystems may be deployed, for example, in enterprise storage applications. In these NVRAM-based storage subsystems, the controllers may be organized into a hierarchy including: slave controllers, which coordinate operations on a subset of NVRAM devices, and master controllers, which coordinate multiple slave controllers. The slave controllers may be in communication with the master controller. The slave controllers and master controllers may be configured to monitor I/O access pattern. Acting in concert with a device driver on host computing device, slave controllers and master controllers may intelligently schedule and carry out I/O operations on individual NVRAM devices on the NVRAM-based storage subsystem.

In some implementations, a slave controller may be configured to control data transfer by coordinating and monitoring flash media access pattern of the NVRAM device that houses the slave controller. The monitored flash memory access pattern may be stored in the memory of the slave controller. The memory of the slave controller may include a portion of a flash memory media of the NVRAM device. The memory of the slave controller may also include a portion of DRAM on the slave controller. The slave controller may report the monitored access pattern to a master controller in the NVRAM-based storage system. The reported access pattern from various slave controllers on respective NVRAM devices may allow the master controller to obtain up-to-date information on the flash media access pattern across all constituent NVRAM devices of the NVRAM-based storage subsystem. Based on the up-to-date information of the constituent NVRAM devices, the NVRAM-based storage subsystem may improve its overall I/O performance by, for example, wear leveling, loading balancing, etc. The update-to-date information obtained from the constituent NVRAM devices may also provide guidance for improving the manufacturing process of the NVRAM devices, as will be discussed in detail later in this application.

The NVRAM device may be used as a cache device for a persistent storage device (e.g., a hard disk drive). Data stored on the persistent storage may have a cached copy on the NVRAM device. A naïve implementation may use an indirect mapping based on two maps. First map is between a logic address associated with the data stored on the persistent storage and a logic address associated with the copy of the data cached on the NVRAM device. Second map is between a logic address associated with the copy of data cached on the NVRAM device and the physical address on the NVRAM device where the copy of data is cached. In particular, the first mapping may be resource intensive in that the logical address space associated with the persistent storage and the logical address space associated with the NVRAM device are typically larger than the physical address space (or the physical size) of the persistent storage device or the NVRAM device. In contrast, a direct mapping may be established between a logical address associated with the data stored on the persistent storage and a physical address on the NVRAM device where the copy of the data may be cached. To handle an I/O request for accessing data on the persistent storage device, this direct mapping may be used. This direct mapping maps, directly and without intermediaries, a logical address associated with the data stored on the persistent storage and the physical address on the NVRAM device where a copy of the data is cached. For comparison, the indirect mapping in the naïve implementations maps through an intermediary—the logical address space. Bypassing the intermediary mapping may be advantageous. For example, the direct mapping can lead to reduced overhead, compared to managing multiple maps associated with indirect mapping. The reduced overhead may manifest as lowered write amplification, longer life-time of the NVRAM device, or cheaper cost of the NVRAM device without comprise in performance.

When the NVRAM device is used as an intermediary cache for the persistent storage device (e.g., a hard disk drive), a cache management policy may be enforced to maintain data consistency between data stored on the persistent storage device and the copy cached on the NVRAM device. For example, if the cached data has been updated, such cached data may be considered to be in a dirty state and will eventually need to be written back to the persistent storage device. The dirty state may also be referred to as the non-updated state. In some implementations, writing to the persistent storage device may take place within a threshold amount of time since the update. Similarly, cached data items whose contents are consistent with the original data item stored on the persistent storage device, may be considered to be in a clean state. The clean state may also be referred to as the non-updated state. A cache management policy may choose to evict clean data from the NVRAM cache device to improve the overall cache performance. In some implementations, the eviction may be based on how frequently the underlying data has being accessed. In some implementations, the eviction may be based on how important the underlying data appear to be. Several heuristics may be used to determine whether the underlying data has been frequently accessed or is important. For example, an access intensity of the underlying data may be determined by tracking access to the underlying data within a given period of time. For example, a ranking importance may be assigned to the underlying data. If the underlying data has not been frequently accessed or does not appear to be important, such data may be more likely to be selected for eviction. For example, an access threshold may indicate the cut-off access intensity while an importance threshold may indicate the cut-off importance. The relevant page or segment may be evicted from the NVRAM cache so that new entries may be brought into the NVRAM to facilitate handling of subsequent I/O access requests.

FIG. 1A is a diagram illustrating a host computing device 100 with a NVRAM in accordance with some implementations. On the host computing device 100, user applications 110A to 110N are running at the application level 101. Each running user application may correspond to a process with segments that may include, for example, text 111, data 112, and stack 113. The segments may further include a heap. The Operating System 102 provides an Application Program Interface (API) 122 for the user applications 110A to 110N to access underlying services. In some implementations, device driver 125 may be part of OS 102 to allow high-level user applications 110A to 11N access to hardware devices on host computing device 100. The high level user applications also may be configured to access device level instrumentation and device controls. Device driver may also be part of the OS 102 in other implementations.

Host computing device 100 includes a hardware layer that includes a central processing unit (CPU) 131, main memory 132 that is typically a volatile memory, and non-volatile random-access memory (NVRAM) 133 with a controller 135. The flash memory media may be located on several cards. The cards may be peripheral component interconnect (PCI) cards to be installed on the motherboard of the host computing device using the peripheral component interconnect express (PCIe) edge connector. The motherboard of the host computing device houses CPU 131 and main memory 132 such as dynamic random access memory (DRAM). Host computing device also may include a hard disk device with mechanical arms that may utilize, for example, NVRAM 131 as an adjunct.

Each PCI card may have two types of controllers for performing logical operations, namely, a master controller, which handles host-level interactions; and slave controller(s), which handles flash-level interactions. In some implementations, one physical device on a PCI card may include one master controller, and up to, for example, eight additional physical devices, each implementing two slave controllers. The additional physical devices also may be implemented on daughter boards inserted on a baseboard, a PCI card housing the physical device implementing the master controller. Other implementations may utilize two physical devices—each of which implements one master controller and up to, for example, six slave controllers. One of the master controllers is on the "baseboard" on the PCI expansion slot on the mother board of the computing device, and the other master controller is on the "daughter board" located on an expansion slot on the baseboard. Communication between the host and the daughter board's master controller is routed through the baseboard's master controller.

The master controller and the slave controller(s) may communicate using a proprietary hardware interface. In some implementations, this interface is implemented using pins on the physical devices and traces on the baseboard. In other implementations in which master controller and slave controller(s) are in the same physical device, the interface may be implemented using internal device logic on the physical device.

In the implementations utilizing two physical devices—each of which implements one master controller, communication between the two master controllers may be through the standard interface of PCIe. A proprietary hardware interface also may be feasible.

Acting in concert, the master controller(s) and slave controller(s) implement the data path of the system in some implementations. In other words, they receive commands to perform flash level operations and carry these out against host DRAM resources. The data path aspect refers to the point that the controllers themselves do not determine which flash locations and which DRAM locations are involved in the above operations—this determination is made by the control path of the system. In this context, the data path may also be known as the "data plane," as commonly used in network communications.

The control path of the system is implemented by the driver software, which may be implemented as firmware instructions executed by embedded processors associated with the controllers. There may be only one "driver", per card. The driver software instructions allow each slave controller to communicate independently with the one or more master controllers. In this context, the control path may also be known as the control plane, as commonly used in network communications.

In some implementations, the data path communication may involve the direct memory access (DMA) transfer of data. For example, the driver software may generate DMA instructions including target memory addresses and initiate memory read or write cycles. The DMA instructions may utilize several registers on the master controller(s) or slave controller(s) that can be written and read by the CPU of the mother board or the embedded processors on the master controller(s). These registers may include a memory address register, a byte count register, and one or more control registers. The control registers specify the I/O port to use, the direction of the transfer (reading from the I/O device or writing to the I/O device), the transfer unit (byte at a time or word at a time), and the number of bytes to transfer in one burst.

To carry out an input, output or memory-to-memory operation, a DMA instruction may be issued from CPU to master controller(s) and then to the slave controllers on the corresponding NVRAM card to initiate transfer of data. The DMA instruction contains a count of the number of words to transfer, and the memory address whose contents are to be transferred. The master controller(s) then obtains access to the system main memory 132 for data transfer. Each time a word of data is ready to be transferred between the NVRAM card and the system main memory 132, the controller (master or slave) may increment its internal address register until the full block of data is transferred. The master and slave controller are capable of executing DMA transfers either occurring one word at a time or all at once in burst mode.

In some implementations, the driver software runs on the host computing device as device driver 125. It communicates with the master controller(s) on the card using standard PCIe commands—in standard terminology, the latter are referred to as "memory mapped I/O" (MMIO) instructions (they are load/store instructions at the CPU level, except that they get routed to the appropriate device instead of DRAM). The MMIO instructions may be used to initiate the DMA operations, as discussed above. The driver in turn receives requests from host CPU applications and operating system (e.g., the file system component), using standard host-based APIs and mechanisms (e.g., a system call).

In other implementations, the driver software runs on an embedded CPU coupled with the baseboard master controller. In these implementations, the term "firmware" is usually used to denote the driver software. In still other implementations, the driver functionality may run in a split/parallel fashion across more than one embedded CPU associated with one or more master controllers. In cases where the firmware runs on one or more embedded CPUs, the applications/operating system requests get communicated to the firmware using the same PCIe MMIO instructions, using an intermediate (separate, minimal) software driver, for example, installed on the host computing device.

Figure 1B:
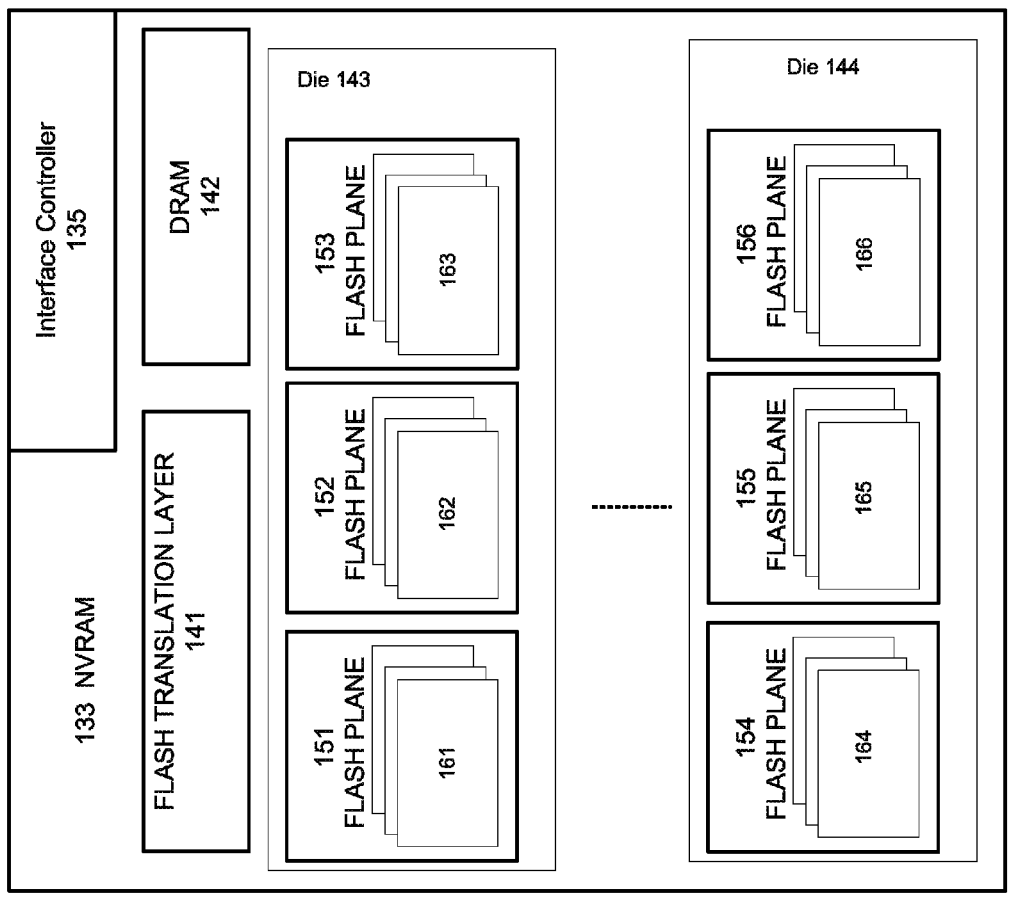
FIG. 1B is a diagram showing an example NVRAM according to some implementations.

FIG. 1B is a diagram showing an example NVRAM device according to some implementations. NVRAM 133 includes a controller 135 to interface with host computing device 100 and other NVRAM devices on NVRAM 133, as will be discussed in association with FIG. 2. NVRAM 133 may also include a flash translation layer (FTL) 141 to map an access request for data in a logical address space to the corresponding physical flash block address. In some implementations, the flash translation layer (FTL) 141 may be realized as part of device driver 125 on host computing device. FTL 141, in conjunction with device driver 125 and the operating system on the host computing device 100, may make linear flash memory appear to the system like a hard disk drive. In this role, FTL 141 may perform a number of specific functions. First, FTL 141 may create "virtual" small blocks of data, or sectors, out of flash's large erase blocks. Next, FTL 141 may manage data on the flash so that the data appears to be "write in place" when in fact the data is being stored in different locations in the flash, over time. Finally, FTL 141 may manage the flash so there are clean/erased flash locations to store data.

Specifically, a particular OS may have block device drivers that perform input and output in structured pieces called blocks. Block devices include all disk drives and other mass-storage devices on the host computing device 100. In some implementations, FTL 141 may emulate a block device. The emulated block device may render the flash media of NVRAM 133 appear, to a user on host computing device 100, as a contiguous array of storage blocks numbered from zero to one less than the total number of blocks. FTL 141 may thus server as a translation layer between the native operating system (OS) file system (FS), such as, for example, DOS BPB/FAT, WINDOWS NTFS, UNIX FS, etc., and the underlying flash media. Moreover, FTL 141 may remap the data to the physical location at which the data is to be written. This allows the native OS file system to treat flash media on a NVRAM device like any other block storage device and remain ignorant of physical characteristics of the flash media on the NVRAM device. To the user on computing device 100, FTL 141 may appear to simply take the data from the file system and write it at the specified serial location (e.g., a consecutive sector). To the underlying flash media on the NVRAM device, FTL 141 places the data at a free/erased location on the flash media and notes the physical location where the data is placed. As a result, when the file system requests for the data that has been placed on the NVRAM device, FTL 141 finds and reads back the proper data. FTL 141 may have its own cache, for example, flash memory media or DRAM, to store such information.

NVRAM 133 may include flash memory media organized in a hierarchy. First, NVRAM 133 includes a card of NVMD. The card can be a PCIe card utilizing the PCI interface and located on a PCI expansion slot of the motherboard of host computing device 100. Such a card may also be known as the baseboard. The card also can be a daughter board mounted on a base board.

Each card of NVMD includes a series of packages, for example packages 143 to 144. Each package may include a series of dice, for example, dice 151, 152, 153 on package 143, dice 154, 155 and 156 on package 144. Each die may include one contiguous semiconductor substrate on which flash media cells are fabricated. In this context, a die may be represented or referenced as a memory chip, and the terms "die" and "chip" are used interchangeably. Each flash media cell is a storage cell that includes a control gate, a floating gate, a source region, and a drain region. Depending on the configuration of the control gate and the floating gate, the flash media may be NAND type or NOR type. Depending on the processing technology of the floating gate, a given flash media cell may be an SLC cell or a MLC cell, as discussed above. The flash media cells on a particular NVRAM device may be processed using the same technology and under the same configuration.

Each die may include a multitude of flash planes, for example, plane 161, 162, 163, 164, 165, 166 respectively on dice 151, 152, 153, 154, 155, and 156. A flash "plane" is a physical sub-die structure and each die may have an even number of flash planes. For a die with two planes, it essentially has two distinct sub-regions—each with their own array of memory cells and interface circuitry. The die may include a simple demultiplexing structure, which sends out commands to one plane or the other (or in some cases, to both planes).

Each flash plane may include constituent blocks of media cells, arranged in collections referred to as erase blocks. Erase blocks may be, for example, 1 MB to 4 MB in size, and represent the smallest unit of flash memory media that can be erased using a single erase operation. Each erase block may in turn contain multiple smaller granularity of write blocks, which represent the smallest granularity of flash memory media that can be written to using a single program operation. The write blocks may be, for example, 2 KB to 16 KB in size. Each write block must first be erased before data contents can be written to the write block. Each write block of media cells may be further divided based on the smallest unit for accessing data contents stored on the flash memory media. For example, for NAND type of flash memory cells, read operations may be performed in blocks (or pages) of size 512 bytes-16 KB.

NVRAM 133 may additionally include dynamic random-access memory DRAM 142 to serve as a buffer between main memory 132 and each constituent package. Both FTL 141 and controller 135 may include additional DRAM of their own.

Figure 2:
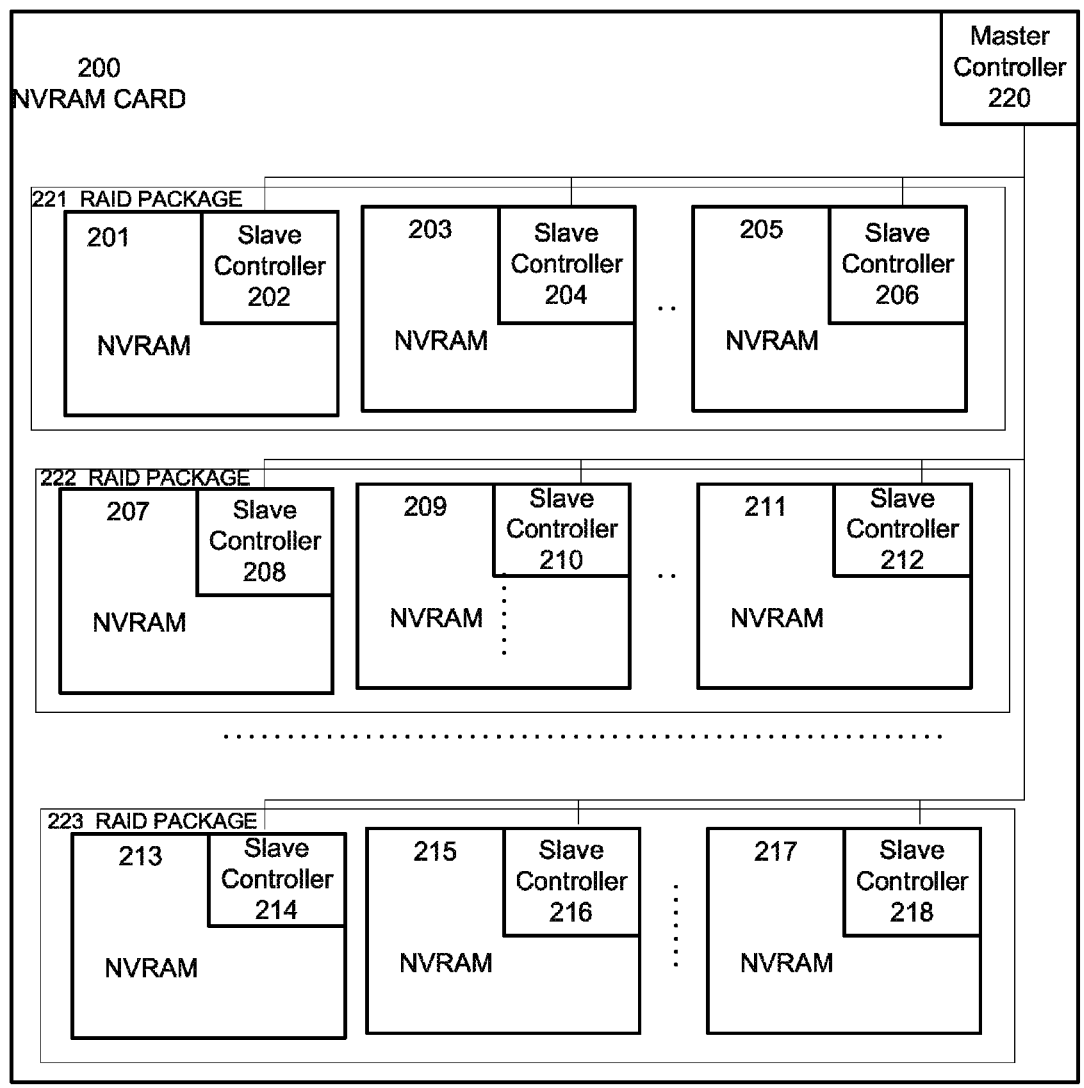
FIG. 2 is a diagram showing a NVRAM device with multiple levels of controllers according to some implementations.

FIG. 2 is a diagram of a NVRAM-based storage subsystem NVRAM card 200 according to some implementations. NVRAM CARD 200 may include packages 221, 222, and 223. Package 221 may include NVRAM devices 201, 203, and 205. Package 222 may include NVRAM devices 207, 209, and 211. Package 223 may include NVRAM devices 213, 215, and 217. These packages may be configured to provide data redundancy using a redundant array of independent disks (RAID) mechanism, as outlined in co-pending patent application 61/746,679. The configured NVRAM-card 200 may store data redundantly in data stripes distributed across packages 221 to 223. In this context, packages 221 to 223 may also be referred to as RAID groups 221 to 223. The grouping can be either static, i.e., predetermined and fixed, or dynamic, i.e. adjustable due to re-striping resulting from I/O errors. Also in this context, a sub-section of a flash memory die may be a region of flash memory media within a die, such as a write page, an erase block, a sector or some suitable logical or physical portion of the flash memory die. When a subsection of flash memory die is in a weakened (or degraded) state, only the data in the degraded sub-section of the flash memory die is replaced, either from mirrored copies replicated elsewhere for reliability, or reconstructed from a parity-based encoding of the data spread across multiple dice. Subsequently, the flash memory die is dynamically re-striped into different planes (or packages), taking into account the weakened (or degraded) portion of the flash memory die. Details of dynamic re-striping can be found in a co-pending patent application 61/746,679.

A NVRAM device may be a NVMD device on the peripheral component interface (PCI) bus of the host computing device. The NVRAM device may also be mounted on other type of buses, such as Dual In-line Memory Module (DIMM), AT Attachment (ATA), Serial ATA (SATA), SATA express (SATAe), Small Computer System Interface (SCSI), etc. A NVMD device in this configuration may be known as a baseboard. Some NVRAM devices may be implemented as daughter boards mounted on a baseboard.

Each NVRAM device on a package (or a RAID group) may have a slave controller that controls the read, write, and erase memory operations on the NVRAM device. The slave controllers 202, 204, 206, 208, 210, 212, 214, 216, 218 on the respective NVRAM devices may be connected to the master controller 220 by a plurality of master-slave memory bus channels, which may be implemented as PCB traces on the baseboard of NVRAM card 200. Each slave controller may be mounted on the package or on the baseboard. Each slave controller may be configured for providing transparent access to the hosting NVRAM device. Each slave controller may include microinstructions tuned for memory operations on flash planes of each NVRAM device. Each slave controller may also include an embedded processor having firmware instructions for performing the same memory access functions.

As illustrated by FIG. 2, NVRAM card 200 may include a master controller 220 in communication with each slave controller on the constituent NVRAM devices of the packages 221, 222, and 223. Master controller 220 may have an embedded processor to execute firmware instructions for read, write, erase, and maintenance operations in coordination with the slave controllers on the slave NVRAM devices of each RAID package. Master controller 220 natively controls the flash memory dice to obtain predictable bandwidth and latency performance with the flash memory dice included in the packages 221-223. All operations that take place on the flash memory dice 201, 203, 205, 207, 209, 211, 213, 215, and 217 (for example, read, write, erase, control operations such as reset, etc.) are completely visible to (and under the control of) the master controller 220. The flash memory interface of a given flash die in a particular package is passed through the respective slave memory controller to the master controller 206. For example, the flash memory interface of the die 201 is passed through the slave controller 202 to the master controller 220.

In this context, device driver 125 on host computing device, along with master controller 220 and each slave controller, may be configured to perform a plethora of operations to improve I/O operation performance on a NVRAM-based storage subsystem. The operations may include, for example, error correction, wear leveling, bad block mapping, read scrubbing or read disturb management, write disturb management, read and write caching, garbage collection, and encryption, etc.

Specifically, the master controller(s) and slave controllers of NVRAM card 200 implements the data path of the system in which data is transported between main memory 132 and the flash memory media of each NVRAM device of the RAID device. The data path of the flash operations may include, for example, data transfers, operation scheduling, etc. In this context, the data path may also be known as the "data plane."

In comparison, the control path determines, for example, the I/O location of I/O operations and the block size of the I/O operations. As discussed above, the control path of flash management activities is implemented by the driver software, which may be implemented as firmware instructions executed by CPU 131 on host computing device 100, or by embedded processor(s) on master controller 220. In this context, the control path may also be known as the control plane.

Error correction may include both detection and correction of flash media errors. Error detection identifies inconsistencies in memory access operations. Error detection may use techniques such as repetition codes, parity bits, checksums, cyclic redundancy checks (CRCs), as well as other cryptographic hash functions. Error correction attempts to cure the identified inconsistencies. Error correction may utilize a variety of techniques such as automatic repeat request, error-correcting code (ECC), etc. Example ECC algorithms may include Reed-Solomon algorithm, Hamming algorithm, and Bose Ray-Chaudhuri Hocquenghem (BCH) algorithm, etc.

A NVRAM device includes flash blocks, each of which can be put through a limited number of erase cycles before exhibiting unreliable behavior. For example, a MLC NAND flash block may withstand 3000-10000 cycles of erase operations before accesses to it return more errors than can be corrected with reasonable implementation complexity. To cope with problems associated with device wear, wear leveling techniques attempt to spread out write operations evenly across all flash segments.

Wear leveling techniques may be dynamic in which the FTL 141 uses a map to link Logical Block Addresses (LBAs) of the file system to the physical flash media in a memory hierarchy as discussed above. Each time the application or an OS component, for example the file system, writes replacement data, the map is updated so that the original physical block is marked as holding invalid data, and a new block is linked to that map entry. Each time a block of data is re-written to the flash memory, it is written to a new physical location on the flash media and the map is updated accordingly to reflect the re-write. However, blocks that never get replacement data sit with no additional wear on the flash memory. The device may be configured so that only dynamic data is recycled. Under the dynamic approach, the NVRAM device may last longer than one with no wear leveling, but there are blocks still remaining as active that will go unused when the drive is no longer operable. Wear leveling techniques also may be static in which the static blocks that do not change are periodically moved so that these low usage cells are able to be used by other data. Wear leveling techniques may additionally include setting aside the static blocks that do not change until other blocks are as worn as the static blocks. The rotational effect associated with the static approach may enable the NVRAM to operate until most of the blocks are near their end of life.

Flash memory blocks have to be explicitly erased before they can be written to. The time taken to erase blocks can be significant. To reduce latency of write, when the information stored at a flash block is to be updated, the controller may be programmed to write a new copy of the changed data over to a fresh block, remap the memory pointers, and then erase the old block later, as a background operation, when there are fewer memory access requests pending.

Together with device driver 125, the master controller 220 and slave controllers may perform read scrubbing or read disturb management. Read scrubbing refers to the process of detecting and correcting bit errors during a read operation and using error detecting codes, such as ECC code, to correct the bit error. A read disturb refers to an I/O error when one or more bits are changed during a read operation. Read disturb errors occur within the block being read, but on a page or pages other than the page being read. Performing a large number (e.g., hundreds of thousands or millions) of read operations on individual pages before an erase command for the block that includes those pages can exacerbate this error. To recover from this type of error, master controller 220 and slave controllers may be programmed to erase the block where the error occurred and rewrite the data to that block.

Together with device driver 125, the master controller 220 and slave controllers may additionally perform "write disturb" management—where a write to a flash cell disturbs the data in another neighboring region in the same write page. In some implementations, write disturb management handling is accomplished by controlling the order in which flash cells are written. In some other implementations, write disturb management handling is accomplished by limiting the subset of cells that receive writes as the device approaches end of life (at the expense of reducing device spare capacity).

Together with device driver 125, the master controller 220 and slave controllers may additionally perform read and write caching. A NVRAM device 133 may include on-chip DRAM 142. Using on-chip DRAMs as a buffer, master controller 220, in combination with slave controllers, may cache information for a read or write operation in accordance with the respective predicted data access patterns. Caching may generally boost the apparently I/O performance as measured in, for example, throughput, apparent access time, etc.

Together with device driver 125, the master controller 220 and slave controllers may additionally perform garbage collection. After every block of a NVRAM device has been written once, the flash controller will need to return to some of the initial blocks which no longer have current data (also called stale blocks). These stale blocks may correspond to data no longer being used by an application program. The data in these blocks may have been replaced with newly written blocks and now they are waiting to be erased so that new data can be written into them. This is a process called garbage collection (GC). As discussed above, GC may be a background task for the master controller 220 and slave controllers in the sense that GC may be performed when there are few pending I/O requests.

Together with device driver 125, the master controller 220 and slave controllers may additionally perform encryption by using a variety of encryption algorithms, including, but not limited to, symmetric encryption and asymmetric encryption. Symmetric encryption may employ, for example, any block cipher algorithm in existence or being developed. Example block algorithms may include, data encryption standard (DES), advanced encryption standard (AES), blowfish, International Data Encryption Algorithm (IDEA), RC5, etc.

Master controller 220 and slave controllers may be further configured for monitoring I/O performance metrics of a NVRAM device and mapping bad blocks. I/O performance monitoring and mapping may be accomplished by a combination of hardware and software solutions. The hardware components of an example NVRAM device have been described above. The software configurations may include implementations through device driver 125 and API 122, as shown in FIG. 1. API 122 may provide an interface for user applications to access NVRAM devices through device drivers 125. A user application may trigger I/O requests to access the NVRAM devices. For example, a user application may attempt to open a file and read the contents of the file, or the user application may query a database for entries matching search criterion.

The I/O requests may be initially sent from the device driver 125 to the master controller 220 on host computing device 100. The master controller 220 may then coordinate the distribution of the I/O requests to the slave controllers on the NVRAM device holding informational content to which the I/O requests are addressed. The I/O requests may then be pushed to the slave controllers in a non-blocking manner in which the master controller 220 does not stay idle to wait for the responses from the slave controllers. Instead, the master controller 220 may continue with other scheduled tasks. When the response from the slave controllers arrives, follow-up actions may be invoked at the master controller 220 as well as the device driver 125 to coalesce the responses and relay the information back to the user application that triggered the I/O requests. As discussed above, the non-blocking and blocking data transfers may be implemented as DMA data transfers.

Figure 3:
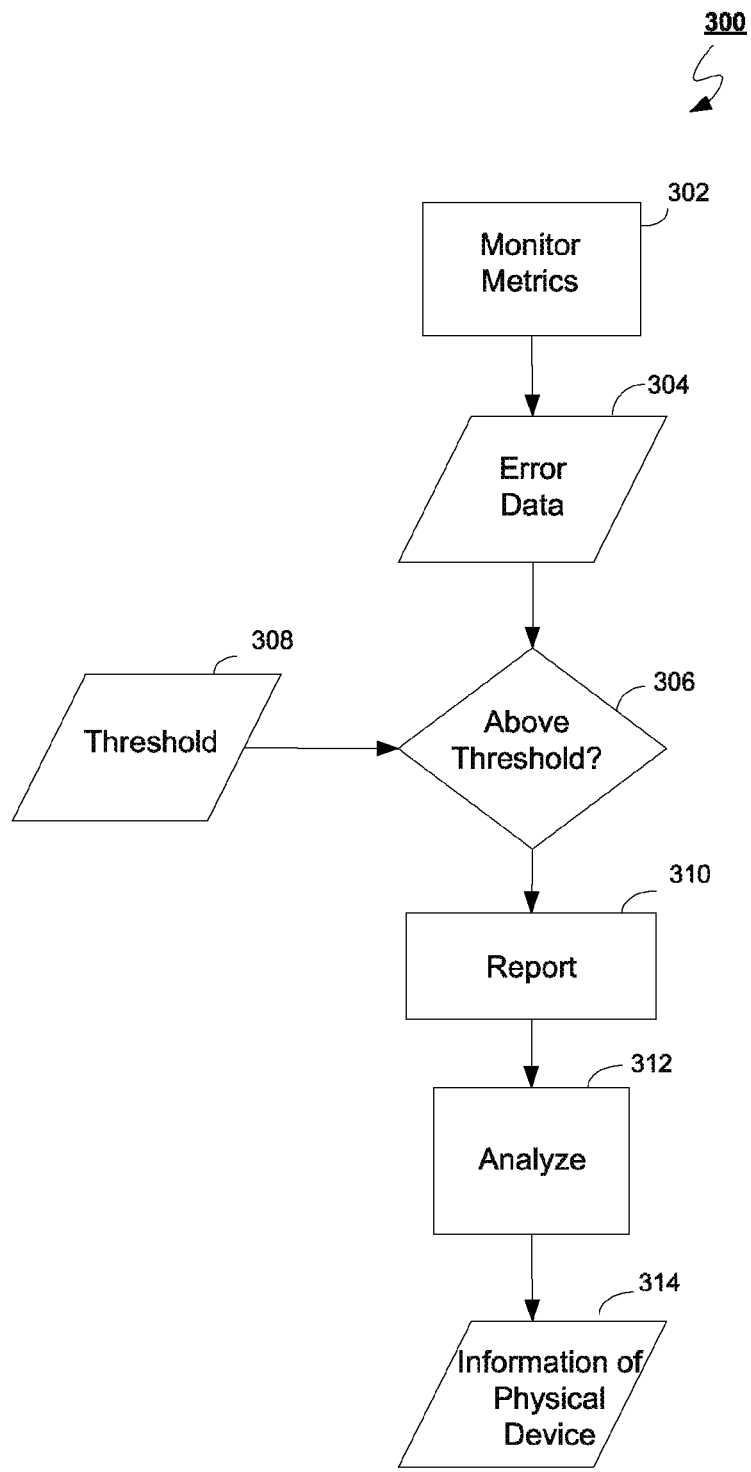
FIG. 3 is a flow chart of monitoring metrics and reporting I/O errors according to some implementations.

FIG. 3 shows flow chart 300 for monitoring metrics and reporting I/O errors according to some implementations. A combination of hardware and software solutions, as discussed above, may act in concert to monitor a performance metric of I/O operation at each NVRAM device of a NVRAM-based storage subsystem (302). The performance metric may pertain to the duration of an I/O operation, such as, a read, a write, or an erase. In some implementations, the duration time of an I/O operation being monitored may include the program time for writing and reading from a buffer. The performance metric being monitored may also include number of correctable errors or error rate for the I/O operations. The correctable errors may be identified by an error checking mechanism, such as, for example, a check sum, a cyclic redundancy coding (CRC) or an error-correcting code (ECC). A correctable error, once detected, may be corrected by, for example, an ECC coding mechanism. A related performance metric may be the bit error rate that represents failing bits corrected with appropriate levels of ECC. A raw bit error rate (RBER) may represent bit error rate prior to ECC. Since the correctable bit errors do not result in data loss, an uncorrectable bit error rate (UBER) may indicate the amount of data loss under a given ECC implementation. Typically, the performance of a given ECC coding scheme correlates with the amount of spare space allocated to each read/write page (block). Often times, an NVRAM device may need more spare space of ECC to achieve a lower UBER, for example, under $10^{-17}$. In some implementations, the spare space may allow correction of up to 80 bits per 1 kB of data for a 20 nm class NAND flash device. In some implementations, error rate or correctable error may be monitored on a per operation basis at the level of each bit/bite being accessed at run-time. In other implementations, the error rate or correctable error may be monitored on a summary basis, for example, an aggregate of many operations or an aggregate of bits/bytes being accessed at run-time. Master controller 220 and slave controllers on each NVRAM device may perform the tracking and monitoring operations.

Master controller 220 may coordinate slave controllers 202 to 218 to monitor an I/O operation on the respective hosting NVRAM device. For example, when measuring the speed of an I/O request, master controller 220 may send the I/O request for data contents at a particular memory location to a slave controller in charge of that particular memory location. In some implementations, the request may be sent at time 1 with a time stamp on the master controller. The slave controller in charge of that particular memory location may return the data contents at the requested memory location. When the master controller receives the data contents at time 2, it may generate a new time stamp. The difference between the two time stamps indicates the duration for the read/write operation at the particular memory location. In these implementations, the time stamps may be issued according to a local clock on master clock 220. In other implementations, the slave controller, upon receiving the I/O request, may timestamp the receipt time. Upon completion of the requested I/O operation and before the result is returned to master controller 220, the slave controller may timestamp the competition time. The difference between the completion time and the receipt time may be reported by the slave controller back to the master controller 220 as the duration for the I/O operation at the particular memory location. In these implementations, the timestamps may be issued according to a local clock on the slave controller. In still other implementations, if the I/O operation is implemented as a blocking operation in which the issuing process or thread waits for the I/O operation to finish, the application process or thread may simply measure the time elapsed between when the I/O request is issued and the result is returned. In these implementations, the time may be measured according to a system clock on motherboard of host computing device 100.

For example, when measuring an error rate of an I/O request, master controller 220 may send the I/O request for data contents at a particular memory location to a slave controller in charge of that particular memory location. The slave controller in charge of that particular memory location may execute the I/O request to, for example, retrieve a 4 k page of data contents in response to a read request. The data contents are obtained with parity checking codes for verification of data integrity. In some implementations, the slave controller may perform parity checking of the obtained data contents and then compare the checking result with the parity checking codes. Based on the comparison, the slave controller may correct errors in the data contents received, if correctable. Thereafter, slave controller may report the error, or correctable error, to the master controller. The reporting may be delayed, to consolidate a threshold number of errors or correctable errors in one report. The threshold number may be a proprietary number determined heuristically. The threshold number also may be a standard number agreed upon by chip makers and original equipment manufacturers (OEM). The reporting may be triggered by, for example, a counter on the slave controller indicating a threshold number or errors or correctable errors have occurred. The reporting may be triggered by an instruction from master controller 220 in the control path to request reporting from slave controller. The reporting also may be periodic when a pre-determined period of time has elapsed.

In other implementations, slave controller may refrain from error checking or correction for read operations. Instead, master controller 220 conducts error checking and correction upon receipt of the requested data contents. Thereafter, master controller may coalesce the identified errors or correctable errors before reporting to host computing device. The coalescing may consolidate a threshold number of errors or correctable errors in one report. The threshold number may be a proprietary number determined heuristically. The threshold number also may be a standard number agreed upon by chip makers and original equipment manufacturers (OEM). Reporting to host computing device 100 may be triggered by, for example, a counter on master controller 220 indicating a threshold number or errors or correctable errors have occurred. The reporting may be triggered by a request from device driver 125 on host computing device for information on error counts or error rate. Reporting to host computing device 100 may be periodic, e.g., whenever a pre-determined period of time has elapsed.

The granularity of the I/O operation being tracked for monitoring a performance metric may vary across implementations. Some implementations may track the I/O operations at the granularity of an individual write page. Example write pages may range in size from, for example, 2 kB to 16 kB. Some implementations may track the performance for each erase block which may include multiple write pages. Others implementations may track the I/O operations at coarser granularities, such as, for example, at the granularity of each die plane (which includes multiple erase blocks), at the granularity of each flash die (which includes multiple die planes), at the granularity of each package (which includes multiple flash dice), or at the granularity of each card (which includes multiple packages).

The granularity of tracking and monitoring may be a function of the age of the NVRAM devices of the NVRAM-based storage subsystem. Earlier on in their expected life time, the granularity can be coarser as the I/O operations are expected to run smoothly then. Later on in the life time of the NVRAM device, the granularity may be finer due to an increased likelihood of errors and degradation in the I/O operations. The granularity of tracking and monitoring may hinge on the specific application utilizing the NVRAM-based storage subsystem. For applications in which data integrity and reliability may be a paramount concern, such as remote and distributed database applications demanding atomic operations for data coherence across distributed data storage locations, the granularity of tracking and monitoring may be finer. For applications in which data throughput may be favored over data integrity, such as, for example, routine data back-up for an e-commerce data server, the granularity may be coarser.

The frequency of monitoring the I/O operations may also vary across implementations. The monitoring frequency can be configured for each NVRAM device according to a user preference. For example, for routine data back-up on a campus network, the user may prefer less frequent and more sporadic tracking and monitoring of I/O operations. For example, for banking applications or high-frequency trading applications, the user may prefer more frequent and less sporadic tracking and monitoring of I/O operations.

In some implementations, the request for tracked information may be issued by an application program and then queued at master controller 220. For example, master controller 220 may receive 4 kB-sized I/O requests and may distribute them to four (4) slave controllers, each receiving 1 kB-sized I/O requests. Each slave controller may send request completion packet to master controller 220 to signal that the requested information is available. The slave controllers may execute the received requests and respond with the completion packet out of the order in which the requests were received, given the different load conditions on each slave controller. The completion packet arriving at the master controller 220 may trigger a follow-on action at the master controller 220. In response, the master controller may match a given completion packet to a particular request that was sent to the slave controller. Master controller 220 may further rearrange/reorder the completion packets from the slave controllers to which the requests were sent. Once all completion packets have been received, master controller 220 may coalesce the completion packets and reply to the requesting application with the requested information. In other implementations, the slave controllers may sua sponte track the performance metric of I/O operations on the NVRAM device and then periodically send the tracked performance metrics to master controller 220. Depending on the overall load conditions of the controllers on the NVRAM device, the slave controllers can be configured to track the I/O operations sua sponte, or at the request from master controller 220.

The tracked I/O operations may generate error data 304. In this context, error data may generally refer to metrics tending to show I/O errors, error rates, correctable errors, as well as I/O operation durations. Error data 304 may be compared (306) with a threshold setting, the crossing of which may cause an error report to be generated at slave controllers and then propagated to master controller 220. The threshold 308 may be a cut-off bar. For example, the threshold 308 may be a duration threshold associated with a memory operation, such as a read, write, or erase. The duration threshold may be the upper limit for the memory operation, the surpassing of which triggers an error report. The duration threshold may also be a time-out value, beyond which the memory operation will be aborted. The threshold 308 may also be a floor level of the number of read, write, or erase, per unit time. This floor level may detect NVRAM devices with an abundance of defective flash pages. For erase operations, the threshold 308 also may be a floor level. Because of flash memory media geometry, I/O operations such as erase may end up becoming faster in the weakened or degraded region. If the duration for erase operation falls under the floor level, an error report may be generated. The threshold 308 may also be a threshold ratio of cells that hold data inconsistent with what was stored. Once the monitored ratio reaches the threshold ratio, an error report may be triggered. The threshold 308 also may be a threshold number of the occurrences of correctable errors as witnessed by master control 220. If the number of correctable errors seen by the master controller 220 exceeds the threshold value, an error report may be generated.

The threshold 308 may be adapted and adjusted on the fly at run time and during field operations. In addition, the threshold 308 may be stricter during the early life-time of a NVRAM device and may be relaxed towards the later stages of the life-time of the NVRAM device. As discussed above, during earlier stage of the life-time of the NVRAM device, fewer wear-induced anomalies are expected while in later stages of the life-time of the NVRAM device, more anomalies are expected due to wear and use over time. An adjustable threshold may strike a balance in the trade-off between the number of alerts generated (which may slow down regular performance) and the amount of information obtained from monitoring.

In some implementations, the threshold 308 may be dynamically configured according to any machine learning scheme or generic algorithms that can improve on its own. The machine learning scheme or generic algorithm can learn from past patterns of I/O performance metrics to infer an optimal threshold value to best differentiate a normal region from a weakened or degraded region. Thus, adjustments of the threshold value may be made accordingly based on the inference. In other implementations, the thresholds may be programmed beforehand in a pre-determined manner. The pre-determined threshold value may be based on a statistical analysis, such as, for example, a student t-test, an ANOVA analysis, etc. The statistical analysis may consider the correlation of historical I/O performance metric and actual device status to derive the threshold value that optimally differentiates a normal group and a weakened/degraded group. The optimality of the differentiation may be based on the highest confidence level statically, the lowest p-value, etc.

In still other implementations, the threshold 308 may be adjusted retroactively based on a statistical analysis of current error reports from monitoring a given performance metric. In these implementations, a history of recorded performance metrics may be available on the master controller 220 on host computing device 100. The history data of a given performance metric may indicate a trend towards, for example, increased latency in a memory operation. The history data may reveal both long term and short term trends. Short term trends may be based on error data measurements collected over a period of hours or days while long term trends may refer to analysis based on measurements collected over longer time periods such as weeks or months. The trend may be analyzed based on a linear prediction (LP) model. In addition, the statistical analysis may reveal outliers from a distribution of recorded performance metrics. The cut-off threshold may be expressed as a statistical bar. For example, for a performance metric based on memory access speed, the statistical bar could be at 2-sigma above the mean access speed. For a normal distribution, a statistic bar at 2-sigma singles out approximately 5% of samples as outliers at the margins.

Table 1 below summarizes example threshold values of I/O performance metrics to trigger an error report in som implementations.

TABLE 1

Example threshold values of I/O metrics to trigger error report

| PE cycle range | Min Correctable Error Threshold (per 512B) | Max Correctable Error Threshold (per 512B) | # of 512B blocks in erase block showing correctable errors above min threshold | Write Time Threshold | Erase Time Threshold |
|---|---|---|---|---|---|
| 0-2000 | 1 | 3 | 4/2048 | 1.5 ms | 2.0 ms |
| 2000-3500 | 3 | 5 | 4/2048 | 1.5 ms | 2.0 ms |
| 3500-5000 | 5 | 10 | 8/2048 | 1.5 ms | 2.0 ms |
| 5000-7500 | 8 | 15 | 32/2048 | 2.0 ms | 3.0 ms |
| 7500-10000 | 12 | 20 | 128/2048 | 2.2 ms | 3.0 ms |
| 10000-20000 | 18 | 30 | 256/2048 | 2.5 ms | 3.0 ms |

The thresholds in Table 1 are established based on the wear level of an average flash cell, as measured by the current Program/Erase (P/E) cycle that the flash cell is on. For context, each erase operation increments the P/E cycle count for that erase block. For a flash memory cell currently at 2500 P/E cycle, which is covered by the second row in Table 1, the min and max threshold of correctable errors (per 512 B) are tabulated at 3 and 5, the threshold number of 512 B blocks in each erase block showing correctable error above the min threshold is tabulated at 4, the threshold write time is tabulated at 1.5 ms, and the threshold erase time is tabulated at 2.0 ms. As discussed above, these threshold values tend to become more relaxed when NVRAM-based storage subsystem becomes more aged (i.e., when the P/E cycle of the underlying flash memory cell has increased).

As discussed above, if a threshold (308) is exceeded or unmet, error report may be generated based on the error date (310). The reported error data from all constituent NVRAM devices may be analyzed (312). In some implementations, the error reports may be analyzed at various flash region granularities in association with the memory access operations being monitored. For example, the error report may be analyzed at the granularity of each write page and a write page may be 2 k-16 k bytes. The error report may also be analyzed on the basis of each erase block that includes a multitude of write pages. In this mode, each write page may not be analyzed individually but will be analyzed in the aggregate. The error report may additionally be analyzed at the plane level, with each plane including multiple erase blocks. In this mode, the erase blocks will be only be analyzed in the aggregate. The error report may further be analyzed at the die level in which the underlying planes will be analyzed in the aggregate rather than individually. The error report may further be analyzed at the granularity of each package in which the multiple underlying dice are analyzed in the aggregate. Likewise, the error report may be analyzed at the level of each card, which is the coarsest level of analysis.

The granularity of the analysis may be a function of the age of the NVRAM device. Earlier on in their expected life time, the granularity can be coarser as the I/O operations are expected to run smoothly then. Later on in the life time of the NVRAM device, the granularity may be finer due to an increased likelihood of glitches in the I/O operations. The granularity of analysis may hinge on the specific application utilizing the NVRAM device. For applications in which data integrity and reliability may be a paramount concern, such as remote and distributed database applications demanding atomic operations for data coherence across distributed data storage locations, the granularity of analysis may be finer. For applications in which data throughput may be favored over data integrity, such as, for example, routine data back-up for an e-commerce data server, the granularity may be coarser.

In some implementations, information in the error reports may be projected across various granularities. For example, if the information in an error report reveals good write pages existing within erase blocks that had experienced degraded write pages, then the good write pages may be considered as degraded write pages in an imputed manner. Similarly, if the information in an error report reveals good erase blocks in a plane level that includes bad erase blocks previously logged, then the good erase blocks may be considered as bad erase blocks in an imputed manner. Likewise, if the information in an error report reveals good die planes in a that has logged bad planes, the good planes may be considered as bad planes in an imputed manner out of an abundance of caution. Moreover, if the information in an error report reveals good dice in a package that has logged an earlier bad die, the good dice may be considered as bad dice in an imputed manner and out of an abundance of caution. Lastly, if the information in an error report reveals good packages in a card that has logged an earlier bad package, the good packages may be considered as bad packages in an imputed manner and out of an abundance of caution. The imputed approach may be favored for applications demanding high reliability data storage. Such data storage applications can be found in banking industry, electronic trading platform, defense industry (for example, controlling radar/sonar and missile launches, aerospace industry (for example, on-board control on space shuttles, satellites, and space stations), energy industry (for example, real-time control of centrifuges and reactors in a nuclear energy plant).

Status information of physical devices (314) may be generated when the error reports have been analyzed. As discussed above, the I/O access performance metrics may be collected at various times during the life cycle of a NVRAM device. When the I/O performance metrics have been measured, error reports may be triggered, which may then be analyzed (312). During earlier stages, status information of physical devices (314) may be generated less frequently when the expected anomalies are relatively rare. During later stages, status information of physical devices (314) may be generated more frequently when the expected anomalies are more likely.

Figure 4:
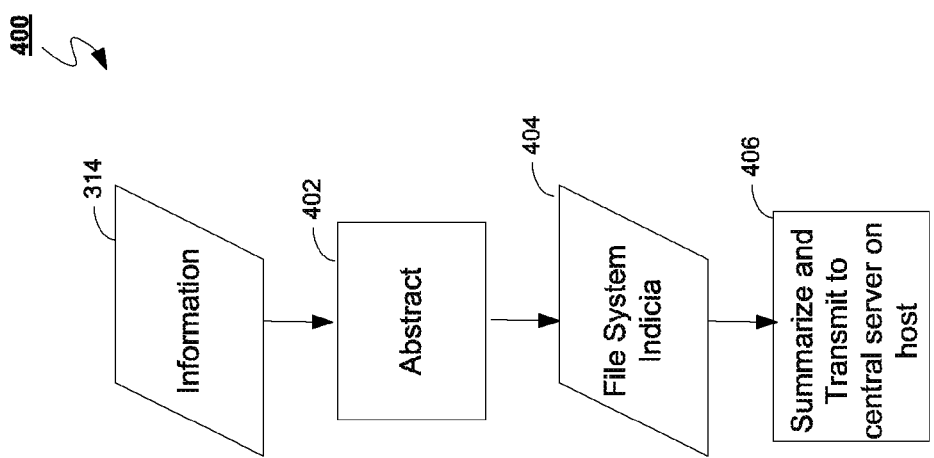
FIG. 4 is a flow chart illustrating a method for mapping defective physical regions on an NVRAM according to some implementations.
Figure 5:
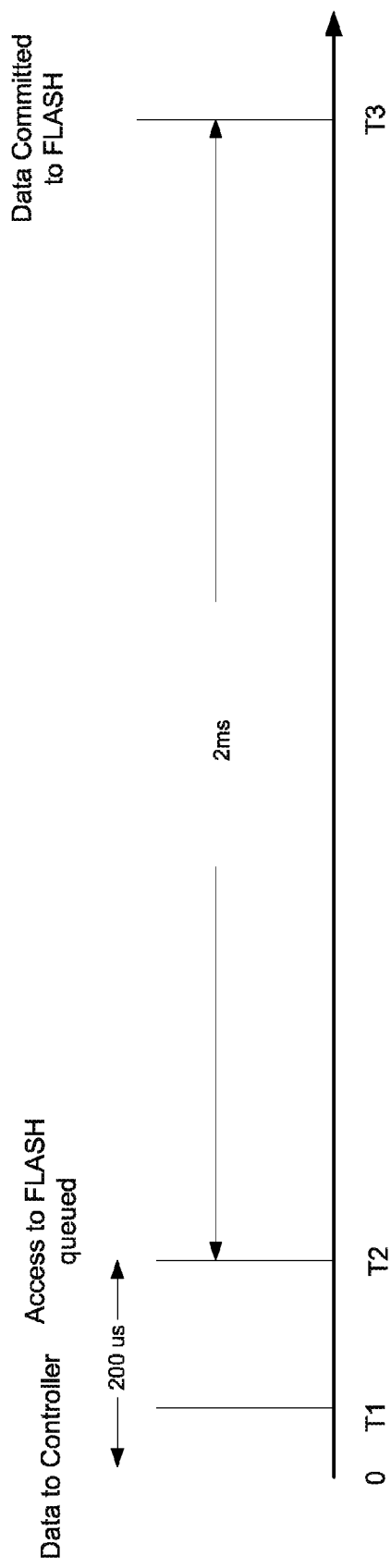
FIG. 5 is a timing diagram illustrating the latency of I/O operations on the NVRAM according to some implementations.

FIG. 4 shows a flow chart of mapping defective physical regions on an NVRAM device according to some implementations. Generally, the information generated may be used to map weak regions of the NVRAM storage. In some implementations, the weak regions may correspond to weaker areas within an underlying flash memory media. Weaker or degraded areas within an underlying flash memory media generally refer to the areas that are more prone to an error report. For example, weaker or degraded areas may be more likely to receive a report of write page error than other areas of the underlying flash memory media when the threshold level for error reporting remains uniform throughout the underlying device. For example, the weaker or degraded areas within an underlying flash memory media may correspond to regions that have received disproportionately more error reports than other regions. For example, the weaker or degraded areas of the underlying flash memory media may have a more lenient threshold than other regions. In other implementations, the weak or degraded regions may also correspond to an entire flash memory media device. For example, weaker flash memory media may be more likely to receive an error of write page error than other NVMDs when the threshold levels for error reporting are identical throughout. For example, the weaker flash memory media may correspond to those NVMDs that have received disproportionately more error reports than other devices. For example, the weaker flash memory media may have a more lenient threshold level than other NVMDs. The identification of weaker areas within an underlying flash memory media or a weaker flash memory media may render the entire card in a degraded state.

When weakness or degradation of the NVRAM device has been mapped, subsequent I/O operations to the mapped weak regions may be reduced. Generally, the weaker or degraded areas are the areas that have bad I/O performance characteristics which may or may not be bad enough to cause the areas to be inoperative. The weaker or degraded areas may not correspond to just the nearest neighbors of the inoperative regions. As a general rule of thumb, however, as the NVRAM devices ages, the I/O performance metrics may be tracked more often and weaker regions are likely to deteriorate from weaker regions to inoperative regions.

Referring to Table 1, for correctable error counts, flash regions that show more than the "max correctable error threshold" may be labeled as "inoperative". flash regions exhibiting error count properties larger than "min" and less than "max" may be labeled as "degraded"—and as an example, subject to lower read disturb thresholds. For write time thresholds, a constant factor (e.g., 1.5 or similar numbers) may be used in some implementations to differentiate degraded and inoperative regions. For example, with a write duration threshold of 2.0 ms, flash regions seeing program times of less than 2 ms may be considered normal, flash regions seeing program times above 2.0 ms but less than 3.0 ms may be considered degraded, and flash regions seeing program times above 3.0 ms considered inoperative.

Once the physical locations of the weakened or degraded regions are mapped on each NVRAM device of a NVRAM-based storage subsystem, an application on host computing device needs to be made aware of these physical locations. Initially, physical locations of degraded or inoperative regions on each constituent NVRAM devices may be summarized for the NVRAM-based storage subsystem (402). For example, the storage may be on a special portion within the NVRAM, such as a Single-Level-Cell (SLC) portion to facilitate or improve I/O operation performance. As discussed above, SLC portions may provide faster memory access than MLC portions at the expense of smaller capacity per unit cost. Thereafter, the summarized information of the physical locations (404) may be persisted (406), for example, at a central server.

Based on this summarized information, FTL 141 may avoid these bad blacks when mapping physical locations on the NVRAM storage subsystem to logical block address (LBA). The LBA is the block device view presented to the operating system for mapping to a logical block in the file system, as seen by an application. The LBA may be specified on a linear basis.

The stored information may reveal a system-level representation of the bad blocks for the entire NVRAM-based storage subsystem.

The system-level representation of bad blocks on NVRAM devices on the NVRAM-based storage subsystem may be utilized in a variety of ways for device management. The status information may be used to characterize pre-manufacturing defects as a feedback to the processor of the underlying semiconductor components on, for example, yield, defect distribution, device durability, etc. The system-level representation of bad blocks may also be used as feedback to product manufacturing. The feedback may provide information on reliability of the NVRAM devices as manufactured. The system-level representation of bad blocks may additionally guide deployment of the NVRAM devices in an enterprise computing environment as an NVRAM-based storage subsystem. The deployment may provide a central reporting capability for the slave controllers to submit error reports to a central location, for example, through master controller 220.

Based on the system-level implementation, fewer I/O operations may be scheduled in the mapped weaker or degraded areas as summarized in the system level representation. Based on the summarized representation of weaker or degraded areas, various memory access scheduling may be performed. At the page level, for example write operations in the mapped weaker or degraded areas may be disabled and only read operations may be allowed in the mapped weaker areas. For example, read operations in some weaker or degraded areas may be stopped when the correctable error associated with the weaker or degraded areas surpasses threshold levels in a consistent manner. For example, read operations in some weaker or degraded areas may be stopped when the aggregated read errors in these weaker areas exceed a critical ceiling number. These read operations may be resumed after the corresponding information in the weaker or degraded areas is relocated to other flash regions.

At the block level, for example, I/O operations may be scheduled to shift from using both fast and slow pages to only using fast pages. In some implementations, fast pages may have an associated I/O latency on the order of 400 μs while the slow pages may generally have an associated I/O latency of less than about 2 ms.

Figure 6:
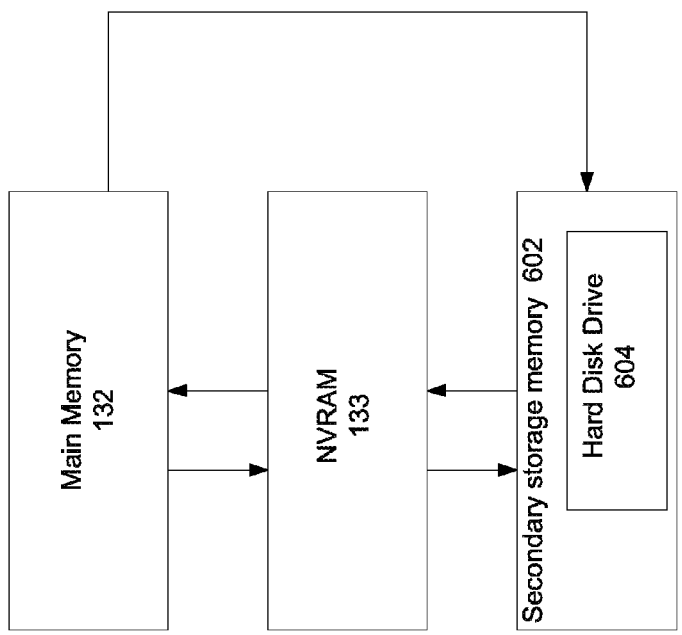
FIG. 6 is a diagram of a memory and data storage system including a NVRAM device as a cache device.

FIG. 6 is a diagram of a memory and data storage system 600 including a NVRAM device as a cache device. System main memory 132, as discussed above, is a volatile memory that may include any dynamic random access memory (DRAM) or static random-access memory (SRAM) devices. System main memory 132 may be regularly refreshed to retain contents. In case of a power outage, system main memory 132, on its own, may not retain data contents stored. System main memory 132 also may be known as the primary memory.

Secondary storage memory 602 may include a single hard disk drive (HDD) (such as HDD 604), a redundant array of independent disks (RAID), a portion of a storage area network (SAN) or network area storage (NAS), or other solid state devices (SSDs) either in the local machine or in a network appliance.

For example, HDD 604 can be any data storage hard disk drives with one or more rigid ("hard") rapidly rotating discs (platters). The discs have magnetic heads arranged on a moving actuator arm to read and write data to the surfaces of the discs. The discs retain the data stored thereon even after power is off. HDD 604 typically has a capacity that is substantially larger than system main memory 132. HDD 604 typically has an I/O speed that is substantially slower than system main memory 132. HDD 604 typically is cheaper than system main memory 132 per unit size. Example HDD 604 may be manufactured by Seagate, Western Digital, Toshiba, etc.

In some implementations, secondary storage memory 602 may include an array of hard disk drives as a redundant array of independent disks (RAID). In some implementations, secondary storage memory 602 may additionally include optical disks such as, for example, magneto-optical (MO) disks, compact discs (CDs), digital versatile disks (DVD)s, etc. In these example implementations, a NVRAM device may be used as a cache with higher I/O speed and lower capacity than the secondary storage memory 602.

Secondary storage memory 602 may include data communication interfaces for connection with system main memory 132 and NVRAM device 133. Example communication interfaces may include serial ATA (SATA), universal serial bus (USB), or SAS (serial attached SCSI), etc. The communication interfaces may additionally include a wireless protocol for data transfer. Example wireless protocols may include, for example, bluetooth, variants of 802.11, WiMax, etc. In some implementations, the communication interfaces may be configured for enterprise storage connectivity options, such as, for example, fiber channel connectivity, IP/Ethernet-based storage protocols, etc.

NVRAM device 133 can be configured as a caching device between system main memory 132 and hard disk drive 604. As discussed above, NVRAM device 133 may include NAND or NOR Flash media type, NVRAM device 133 also may include MLC or SLC type of Flash memory cells. As a caching device, NVRAM device 133 may serve as a buffer between system main memory 132 and hard disk drive 604 for virtual memory management. In some implementations, the combination of the NVRAM cache device and the secondary storage device may appear as a transparent substitute for the secondary storage device, albeit with higher I/O performance. In these implementations, the I/O requests received by the combination are identical to what the secondary storage device would have received on its own. In particular, the NVRAM cache device receives these I/O requests and attempts to satisfy them first with data items that are stored in the cache provided by the NVRAM cache device. In the attempt, the NVRAM cache device looks up the logical block address (LBA) associated with the I/O request in an internal table to obtain information about whether or not the requested LBA is present in the cache, and if present, at which cache location.

If data item associated with the I/O request is present in the cache, the I/O request is carried out against the NVRAM cache device, with interactions with the secondary store determined by the particular cache mode. In particular, read operations can be served using the cache. Write operation handling may vary depending on whether the cache mode is "write-through" or "write-back". For write-through cache mode, the write operation is carried out against both the cache and the secondary storage device. For write-back cache mode, the write operation is carried out only against the NVRAM cache device—leaving it up to an asynchronous process to reconcile the cache updates with the secondary storage device.

When the data item associated with the I/O request is not present in the cache, the I/O request is carried out against the secondary storage device. In addition, for the two cache modes—"write back" and "write-through", the data item is also populated in the cache so that subsequent I/O accesses may be satisfied without interacting with the secondary storage device.

In particular, during read operations, if the look-up table reveals that the page of data being read is not in the cache, a cache miss may occur. In response, OS 102 will fetch the page of data from HDD 604. The I/O speed of fetching data from HDD 604 is at the I/O speed of the HDD and is inherently slow. If a cache miss occurs, the apparent response latency, as seen by the user application on OS 102, would be longer than if the cache miss had not occurred. In some implementations, OS 102 may proactively fetch data from blocks surrounding the data item or block that has given rise to the cache miss, if such surrounding blocks have not yet been fetched into the cache. This proactive fetching may be based on a prediction algorithm and if the prediction is correct, early fetching can reduce the aggregate time of fetching from secondary storage device, such as HDD 604.

While fetching data from HDD 604, if the cache is full, then at least one data item or block needs to be evicted from the cache to make room for the data to be fetched. The data item or block to be evicted may be selected based on a block replacement policy. Example block replacement policy may include: least recently used (LRU), least frequently used (LFU), most recently used (MRU), or most frequently used (MFU), first in first out (FIFO), stacking, etc.

Write operations may be performed in accordance with three types of caching policies, namely, write-through, write-back, and write-around. Write-through policy works for a write-hit condition when there is a write-request to write a page of data and the page of data has been fetched into cache. Under the write-through policy, the page of data is written to cache provided by NVRAM device 133 and written to secondary storage memory 602. The write-through policy favors both data integrity/consistency and data throughput at the expense of operation latency.

Write-back policy also works for a write-hit condition. Under the write-back policy, the page of data is written to cache provided by NVRAM device 133 but is not flushed to secondary storage memory 602 until a later time. Instead, the issuing application process (or thread) on host computing device is allowed to proceed without confirmation that the requested page of data has been completely written to secondary storage memory 602. This deference may provide the illusion of a quick response to a user application on OS 102. After the page of data is written to the cache and before the data is flushed to secondary storage memory 602, the look-up table on the NVRAM may be updated to reflect that this particular page is "dirty" in the sense that the cached copy is more recent than the copy on the secondary storage memory 602.

When the cache is full, or on receipt of a garbage collection request to clean up data pages, a dirty page on NVRAM device 133 may be evicted. For example, in response to read request, a new page may be fetched from secondary memory storage 602 and to make room for the new page, a dirty page on NVRAM device 133 may need to be evicted. The data contents of the dirty page being replaced will be written to secondary memory storage 602 before the dirty page is evicted from cache.

The write-back policy takes advantage of locality of references of writes to reduce the amount of write traffic going to the secondary memory storage 602, thereby improving apparent latency as seen by user application on OS 102. Specifically, write-around policy works for a write-miss condition when a write-request to write a page of data is received but the page of data referenced by the write-request is not in NVRAM device 133. Under the write-around policy, OS 102 will not fetch data from secondary memory storage 602. Nor will OS 102 perform any write-invalidation on NVRAM device 133. Instead, OS 102 directly commits the page of data to secondary memory storage 602 and bypasses the NVRAM device 133 without fetching data from secondary memory storage 602.

A write amplification phenomenon can be somewhat unique to the I/O operation of a NVRAM device 133 with flash memory media. Write amplification refers to a situation to realize a number of additional media writes in order to support a write request from the user application 101. This write request from the user application 101 may, for example, request to write one page of data to NVRAM device 133. The additional media writes may occur before the media writes to flush the data contents of the given write request to permanent storage on the NVRAM devices. For example, the additional media writes may be required to relocate valid data in an erase block to make room on the NVRAM devices such that a contiguous space becomes available for writing the data contents of the particular write page. The additional media writes may also occur during or after the media writes to flush the data contents of the given write request to permanent storage on the NVRAM devices. For example, a smaller user write of example granularity 1 KB may result in a larger unit of data of example granularity 4 KB being written to permanent storage on the NVRAM devices. Similarly, the additional media writes may involve resetting invalid data stored elsewhere on the NVRAM devices after flushing the data contents of the given write request to a particular location on the NVRAM device for permanent storage.

When writing new data contents of an incoming write request to a specific location on flash memory media, pre-existing data already stored at the specific location may need to be relocated to a new location before the new data contents can be written to the specific location. In some implementations, relocating pre-existing data to new locations to free up the old locations occupied by the pre-existing data may be performed in parallel with directing current writes to locations on flash memory media that are already freed up. The parallel implementations may improve the concurrency of the I/O operations on the NVRAM device in that incoming new write requests may be completed without having to wait for relocation operations to complete.

As an illustration, consider a hypothetical NVRAM device having 100 units of storage space ranging from page 0 to page 99. The storage capacity of the hypothetical NVRAM device may be advertised as 70 pages, even though it has 100 pages physically available. As the flash memory media of the NVRAM device is being filled up in response to write requests, an incoming write request in the write log may now reach page 80. At this time, the write log may be scanned to identify pages in the 0 to 80 range that correspond to flash memory cells that have become available for storing the new data contents. The data contents in these available flash memory cells may be displaced for various reasons. Because the advertised capacity is only 70 units, it can be expected, for example, that there are at least pages in the 0 to 80 range, which contain invalid data that can be, or has been, garbage collected. For similar reasons, it can be expected that there are more than 10 locations in the 0 to 80 range that contain data that can be, or has been relocated elsewhere on the NVRAM. When relocating the data contents in the identified locations, only valid data need to be relocated. Valid data means data that has not been overwritten or removed. Invalid data means data that has been overwritten or removed. Thus, while at page 80 and in response to new write request, the write log may be scanned to identify locations in the lower range (e.g., lower than page 80) for entry of the new data contents in the new write request. Once the locations on the NVRAM device have been identified, these locations in the lower range (lower than page 80) may be made available for entry of new data contents. Because of the advertised capacity of 70 pages (out of 100 pages that are physically available) and the additional operations of relocating data into new locations elsewhere on the NVRAM device, the expectation is that the relocation and the associated clean-up operations actually impact more than the area on the NVRAM device allocated to receive final entry of the data contents in the write request, thereby leading to more write operations on the flash memory media. In this hypothetical NVRAM of 100 pages but advertised with a storage capacity of 70 pages, the expected ratio of valid to invalid data entry in the worst case is that for every 10 units, 3 units may contain invalid data while 7 units contain valid data. In the hypothetical of reaching page 80 in the write log, scanning the write log may reveal invalid data in 30 pages (out of the 100 pages). This means the hypothetical NVRAM device may take 30 new write pages. For the NVRAM device to absorb the 30 new writes pages, however, additional writes may be warranted because of the need to relocate valid data. Thus, although the hypothetical NVRAM device is only advertised at 70% of its physical capacity, field use may fill up the entire physical storage due to relocation of valid data and garbage collection, leading to more write operations.

As discussed above, erase operations on the flash memory media of a NVRAM device may be performed per erase block, write operations may be performed per write page, and read operations may be performed per read page. One erase block may be the size of several write pages. One write page may be the size of several read pages. On a per-die basis, a write page is of the range about 2 KB-16 KB.

Write amplification may be expressed as an amplification ratio to connote the additional media writes performed in order to support a given write request. For current leading NVRAM devices, write amplification ratios typically range from about 2.5 to 3.5 in worst case scenarios. For write operations with a moderate granularity of 4 kB, illustrative write amplification ratios may be in the range from about 2 to about 2.5.

In the context of using NVRAM device 133 as a cache device between volatile memory, such as DRAM, and persistent storage device, such as a mechanically-rotating hard disk drive, the caching software layer may be implemented as a software layer on top of a traditional block device that serves as a device driver for the NVRAM cache device. In traditional implementations, the caching software layer may include its own translation table. This translation table may map the logical block address (LBA) of the secondary storage device into the logical block address of the NVRAM block device, supported by the flash management layer (FTL). The FTL may make the NVRAM device appear as a block device. In contrast, the caching software layer may include a flash translation component for mapping LBAs. When an I/O request is received from the host computing device to access data on the persistent storage device, the I/O request may include the logical block address (LBA) of the data whose access is being requested. The LBA may be linear based for linear indexing. The I/O request can be one of a read, a write, or a garbage collection. To service the I/O request, the service routine of the operating system may ascertain the location on the NVRAM device where a copy of the data may be found. As discussed above, a look-up table may be consulted to ascertain whether there is a copy of the data being requested on the NVRAM device.

A straightforward implementation to look up the location is to perform the look-up in two steps, namely, one translation from the LBA associated with the data stored on the secondary storage device to the LBA associated with the data to be cached on the NVRAM cache device, and another translation from the LBA associated with the data to be cached on the NVRAM cache device to a physical address on the NVRAM device where the data will be cached. The first translation may be performed by the caching software layer in traditional implementations as discussed above. The physical address may be, for example, a block number or any other index that generally may identify a physical location on the NVRAM device or expose a physical structure of the underlying flash media in the same manner as cylinder, header, sector would for a hard disk drive with mechanically rotating arms, as used in a secondary storage device. Such a straightforward two-step translation would entail two layers of translation. Each layer of translation has its own lookup table that needs to be maintained so that the contents are kept up to date. Thus, each layer will incur its own write amplification overhead in maintaining its translation table. The combined write amplification overhead resulting from two layers of translation may be more than double the amount associated with one layer of translation. Additionally, the first translation, from the LBA associated with the data stored on the secondary storage device to the LBA associated with the data to be cached on the NVRAM cache device, may entail a look-up table about the size of the logical address space. This table size may become significant with larger and larger persistent storage devices, as commonly used in data-intensive applications such as, for example, databases, directory services, or image repositories, etc.

In contrast, a sparse translation approach may obviate the two-step translation and the use of two look-up tables. Specifically, the mapping may be performed in one step, directly from back-end LBA associated with the data stored on the persistent storage device to the physical flash media location. For example, a 64-bit key may represent an LBA on the persistent data storage device. The key may be mapped via, for example, a hash function, to a physical address on a 2-tera bytes NVRAM device. A hash function generally maps each valid input to a hash value in the hash space (generally smaller than the input space). For a given input, the mapping from the given input to the available hash values may be at substantially equal probability. Example hash functions may include message-digest (MD5), checksum, cyclic redundancy check (CRC), etc. Therefore, an incoming write request to the secondary storage device may be mapped, in one stroke, to a physical address on the NVRAM cache device. The data contents of the incoming write request may be written to the NVRAM cache device in a manner consistent with, for example, the write-back policy as discussed above. Storing on the NVRAM device tends to be much faster than storing the same data contents on the persistent data storage. In the eyes of the front-end application processes, it looks as if the data contents have been saved to the secondary storage device and at an I/O speed corresponding to that of the NVRAM device. Thereafter, the data contents cached in the NVRAM device may be written to the second storage device in the background and without being noticed by the front end application processes.

Compared to the naïve manner of translation that involves two translation tables, the sparse translation combines the two layers of translation into one layer of translation. As a result, additional flash writes necessitated by two layers of mapping may be eliminated. These additional flash writes associated with the naïve approach are caused by the additional maintenance requirements associated with two layers of translations. For each layer of translation, a copy of the translation map may be maintained in the system main memory. If there is an update to the translation map in the system main memory, the copy in the flash media of the NVRAM device needs to be updated accordingly. Each additional layer of translation will bring in write-amplification overhead. With two layers of translation, these additional flash writes not only slow down the I/O operation on a system using NVRAM as intermediary cache, they also reduce the useful lifetime of the flash drives measured in the number of writes useful for writing the actual payload data. By virtue of fewer writes against the flash media, the sparse translation implementation may result in more efficient use of flash media and extended longevity of the underlying NVRAM device. Of note is that the extended lifetime under the sparse translation implementation may also be traded for more flash writes to be accommodated within a fixed period of useful lifetime. The extended lifetime enabled by the sparse translation implementation also means that cheaper components, such as MLC type flash media, may be substituted for higher grade flash media type, thereby reducing overall cost of a NVRAM-based storage subsystem using NVRAM device as the intermediary cache device.

In the context of using an intermediary cache device such as a NVRAM device, garbage collection issues may come up under several scenarios, including, for example, unplanned power outage. By way of illustration, for a 2 TB flash to warm up, from the initial state when the flash is empty to a warm state when the flash is populated with cached data entries, it may take a long time, for example, on the order of tens of minutes. At the time of a power outage, to avoid the additional latency to warm up the cache from an initial empty state, a particular cache management policy may generally expect about 90% of data in its cache to continue to be valid after the power outage and the rest 10% data to be invalid and in need of reconciliation. To achieve this distribution, a management procedure may be implemented throughout the various operation stages of the NVRAM device (including, but not limited to the time period of power-outage and recovery) to write updated data contents to persistent storage device (e.g. a hard disk drive) and/or to evict less used or less important data from the intermediary cache. Because the NVRAM device is being used as a caching device, this fact gives rise to the freedom to evict/drop clean data units during garbage collection. In contrast, when the NVRAM device is being used as a block device, such freedom may not be readily available because discarding a data item on a block device generally results in data loss.

Figure 7:
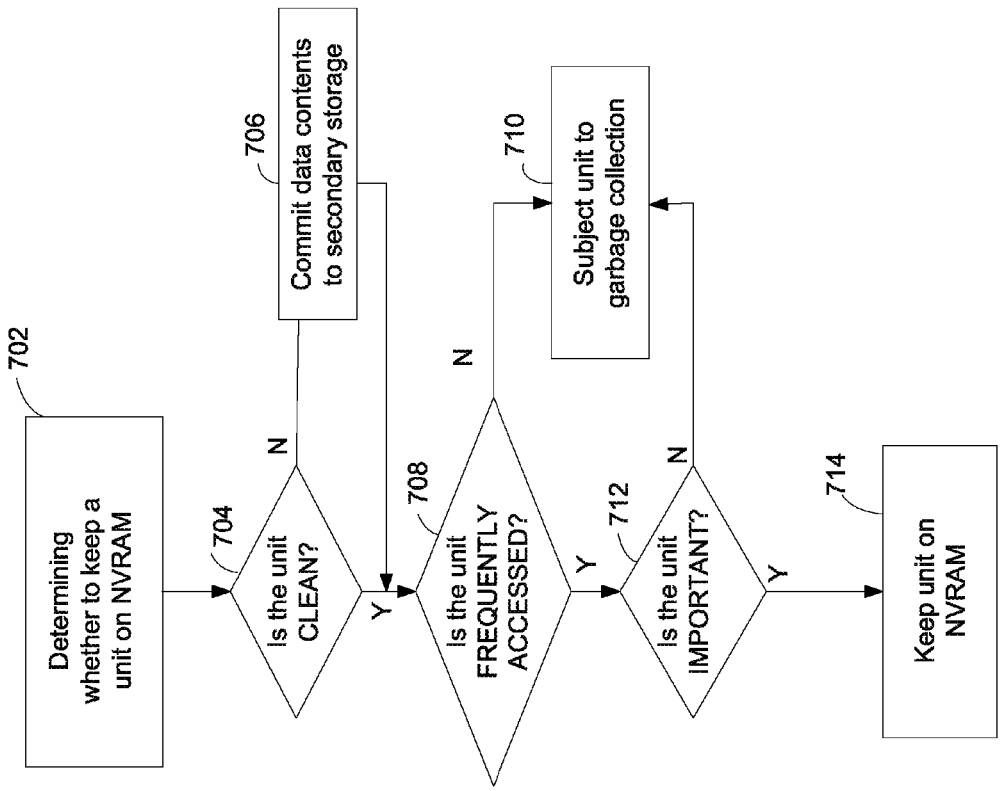
FIG. 7 is a flow chart illustrating a method of managing units of data on the NVRAM.

This freedom is not available when the NVRAM device is used as a block device—since discarding a data item can in general, result in data loss FIG. 7 is a flow chart illustrating a method of managing a NVRAM cache device. The method may be implemented as a background process managing the NVRAM device. The background process may be initiated, for example, when power is up on the NVRAM device after a power outage (702). The process may also be initiated at regular times when power is up and stable.

The process may then scan the NVRAM device, unit by unit. The unit can be at the granularity of a flash segment. A logical flash segment of data may be created by striping a particular amount of flash storage per die across multiple dice to provide redundant encoding of data, as discussed in copending patent application Ser. No. 13/842,940, filed Mar. 15, 2013, and Ser. No. 13/843,511, filed Mar. 15, 2013. A logical segment may encompass logical data volumes larger than an erase block. The unit can also be at a finer granularity such as per write page, which is smaller than an erase block. Initially, the process may determine which unit on the NVRAM cache device should be written to the secondary storage device. A given unit may be in clean state, i.e., no data in the unit has changed since it was last fetched from persistent storage device. In other words, the data contents of the given unit in the NVRAM cache device are up to date with the data contents stored in the persistent storage device. A particular unit may be in dirty state, i.e., some data in the unit has been updated since it was last fetched from the persistent storage device. In other words, the data contents in the NVRAM cache device are more recent compared to the data contents stored in the persistent storage device. If a particular unit is determined as not clean, the data contents of this particular unit will need to be written to secondary storage device (706). This write can achieve data consistency between the cache device and the persistent storage device. In some implementations, if an update in the particular unit on the NVRAM cache device has been in place for more than a threshold amount of time, the update may be written back to the secondary storage device. Thus, a data consistency policy may be enforced such that the data contents in the NVRAM cache device do not deviate from the data contents on the secondary storage device by more than the threshold amount of time. An example threshold amount of time may be five (5) minutes. On the other hand, however, if a given unit is determined as clean, the data contents of the given unit may not need to be written to the secondary storage device because no data has changed on the NVRAM cache device.

Either subsequently or concurrently, the process may determine which unit(s) are to be evicted from the NVRAM cache device. As discussed above, the unit may be as coarse as a logical segment, or at a finer granularity, such as a write page. First, a determination may be made as to whether a particular unit is frequently accessed (708). In some implementations, an access intensity may be determined with regard to requests to access to a particular unit of data. Several heuristics may be used as a metric for gauging the degree to which the data unit is frequently accessed. For example, a least recently used (LRU) policy may be used as a heuristic for determining least frequently accessed data units. For example, a dedicated region on the NVRAM cache device may track the number of times a particular unit has been accessed since last garbage collection (or for a fixed window of time, say, ten minutes). The least frequently accessed data units may correspond to cold objects at the segment level which may be a stale object. Since these objects are not warm, these objects may be evicted from the NVRAM cache device (710) so that space may be made available on the NVRAM cache device for newer entries. In some implementations, an access threshold may be established. If the access intensity of a particular unit of data is within the access threshold, the particular unit of data may be evicted from the NVRAM cache device (710).

Second, a determination may be made as to whether the particular data unit is important (712). In some implementations, a ranking importance may be determined with regard to the importance of a particular unit of data. Several heuristics may be used as a metric for gauging the importance of the underlying data contents. For example, one heuristic may be whether the data contents of the unit have been accessed by multiple threads or user processes. For example, a dedicated region on the NVRAM device may track the aggregate number of threads and/or processes accessing a given unit of data on the NVRAM device. If a particular unit of data is determined as not important based on a heuristic, then the particular unit may be evicted from the NVRAM cache device (710). In some implementations, an importance threshold may be established. If the ranking importance of a particular unit of data is within the importance threshold, the particular unit of data may be evicted from the NVRAM cache device (710). The particular unit may also be made subject to garbage collection even though the data contents on the particular unit may still be valid. For example, the units of data with the lowest ranking importance may be evicted in response to a garbage collection request (710).

In some implementations, the determinations of access intensity and ranking importance may be achieved by associating "attributes" along with the direct translation map described above. The attributes may keep track of whether a data unit is clean (non-updated) or dirty (updated), the access intensity, or the ranking importance. (either specified by the application or file system using the caching device, or inferred by a heuristic). The attributes may be stored on a per-translation entry basis. In some implementations, the attributes can be either inline with the translation entry. In some implementations, the attributes may be stored out of band in a separate array data structure. The separate array data structure may be indexed using the same sparse LBA used to index the sparse translation table as described above.

Thus, a clean but less frequently used unit of data may be evicted from the NVRAM cache device or subject to garbage collection. Likewise, a clean but less important unit of data may also be evicted from the NVRAM cache device or subject to garbage collection. Once these units are made available, the NVRAM cache device may store new entries to respond to incoming I/O data access requests received thereafter. On the other hand, if a particular unit of data is determined as important and/or frequently accessed according to a heuristic, then the particular unit of data will be kept in the NVRAM cache device (714). The controller on the NVRAM cache device, along with the device driver on the host computing device, jointly makes the determinations as to whether a particular unit is frequently accessed or important.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for managing data in a storage system comprising a persistent storage device and a non-volatile random access memory (NVRAM) cache device, the method comprising:
    establishing a direct mapping between a logical address associated with data stored on the persistent storage device and a physical address on the NVRAM device by mapping from a logical address space into a physical address space, wherein the logical address is directed to the logical address space and the physical address is directed to the physical address space, and wherein the logical address space is larger than the physical address space;
    performing the direct mapping from the logical address space to the physical address space by keying a hash to the logical address in the logical address space and equalizing probabilities of mapping a keyed logical address to physical addresses within the physical address space;
    accessing the direct mapping between the logical address associated with data stored on the persistent storage device and the physical address on the NVRAM cache device;
    receiving, from a host computing device coupled to the storage system, a request to access a particular unit of data stored on the persistent storage device;
    using the direct mapping as a basis between the logical address associated with the data stored on the persistent storage device and the physical address on the NVRAM cache device to determine whether the particular unit of data being requested is present on the NVRAM cache device;
    in response to determining that the particular unit of data being requested is present on the NVRAM cache device, servicing the request by accessing a copy of the particular unit of data present on the NVRAM cache device; and
    in response to determining that the particular unit of data being requested is not present on the NVRAM cache device, servicing the request by accessing the particular unit of data stored on the persistent storage device.

2. The method of claim 1, further comprising indexing the logical address by using at least 32 bits.

3. The method of claim 1, further comprising:
    based on determining that the particular unit of data is present on the NVRAM cache device, ascertaining whether the copy of the particular unit of data present on the NVRAM cache device is in an updated state,
    wherein the copy of the particular unit of data present on the NVRAM cache device is in the updated state when the copy of the particular unit of the data present on the NVRAM cache device is more recent than the particular unit of data stored on the persistent storage device.

4. The method of claim 1, wherein receiving the request to access data stored on the persistent storage device includes one of: receiving a read request, receiving a write request, or receiving a garbage collection request.

5. The method of claim 1, further comprising:
    using a logical block address as the logical address to specify a logical location of the data stored on the persistent storage device; and
    using the physical address to identify a physical location on the NVRAM cache device where a copy of the data is stored.

6. The method of claim 5, further comprising:
    formatting the logical block address (LBA) on a linear basis.

7. The method of claim 1, further comprising:
    based on determining that the particular unit of data is present on the NVRAM cache device, ascertaining whether the copy of the particular unit of data present on the NVRAM cache device is in a non-updated state,
    wherein the copy of the particular unit of data present on the NVRAM cache device is in the non-updated state when the copy of the particular unit of data present on the NVRAM cache device is identical to the particular unit of data stored on the persistent storage device.

8. The method of claim 7, further comprising:
    in response to ascertaining that the copy of the particular unit of data present on the NVRAM cache device is in the non-updated state, determining at least one of: an access intensity of the copy of the particular unit of data present on the NVRAM cache device, or a ranking importance of the copy of the particular unit of data present on the NVRAM cache device; and
    deleting, and without writing to the persistent storage device, the copy of the particular unit of data present on the NVRAM cache device in response to determining that the access intensity of the copy of the particular unit of data present on the NVRAM cache device is within an access threshold or the ranking importance of the copy of the particular unit of data present on the NVRAM is below an importance threshold.

9. The method of claim 8, further comprising: deleting, and without writing to the persistent storage device, the copy of particular unit of data present on the NVRAM cache device in response to receiving the garbage collection request.

10. The method of claim 9, further comprising:
    generating the garbage collection request by a write request from the host computing device when the NVRAM cache device does not have sufficient capacity to accommodate the write request.

11. The method of claim 9, further comprising:
    generating the garbage collection request by a background garbage collection process.

12. A NVRAM-based storage subsystem comprising:
    a persistent storage device; and
    a NVRAM cache device in communication with the persistent storage device, the NVRAM cache device comprises:
        flash memory media; and
        a controller in communication with a host computing device, the controller configured to:
            access a direct mapping between a logical address associated with data stored on the persistent storage device and a physical address on the NVRAM cache device, wherein logical address is directed to a logical address space and the physical address is directed to a physical address space, wherein the logical address space is larger than the physical address space, wherein the direct mapping is from the logical address space into the physical address space, wherein the logical address is indexed by at least 32 bits, wherein the mapping from the logical address space to the physical address space comprises an association map based on a hash, and wherein the hash is keyed to the logical address and is configured to equalize probabilities of mapping a keyed logical address to physical addresses within the physical address space;

receive, from the host computing device, a request to access a particular unit of data stored on the persistent storage device;

use the direct mapping as a basis between the logical address associated with the data stored on the persistent storage device and the physical address on the NVRAM cache device to determine whether the particular unit of data being requested is present on the NVRAM cache device;

in response to determining that the particular unit of data being requested is present on the NVRAM cache device, service the request by accessing a copy of the particular unit of data present on the NVRAM cache device; and in response to determining that the particular unit of data being requested is not present on the NVRAM cache device, service the request by accessing the data stored on the persistent storage device.

13. The storage system of claim 12, wherein the persistent storage device comprises a hard disk drive with a rotating arm, a redundant array of independent disks (RAID), a portion of a storage area network (SAN) or network area storage (NAS), or a solid state device (SSD) either on the host computing device or in a network appliance in connection with the host computing device.

14. The storage system of claim 12, wherein the flash memory media comprise at least one of: NAND Flash memory media, NOR Flash memory media, SLC-type Flash memory media, or MLC-type Flash memory media.

15. The storage system of claim 12, wherein the logical address comprises a logical block address (LBA) to specify a logical location of data stored on the persistent storage device; and wherein the physical address identifies a physical location on the NVRAM cache device where a copy of the data is stored.

16. The storage system of claim 15, wherein the logical block address (LBA) is linear.

17. The storage system of claim 12, wherein the controller is further configured to:

in response to determining that the data is present on the NVRAM cache device, ascertain whether the copy of the particular unit of data present on the NVRAM cache device is in a non-updated state or in an updated state, wherein the copy of the particular unit of data present on the NVRAM cache device is in the non-updated state when the copy of the particular unit of data present on the NVRAM cache device is identical to the data stored on the persistent storage device, and wherein the copy of the particular unit of data present on the NVRAM cache device is in the updated state when the copy of the particular unit of data present on the NVRAM cache device is more recent than the data stored on the persistent storage device.

18. The storage system of claim 17, wherein the request to access data stored on the persistent storage device includes at least one of: a read request, a write request, or a garbage collection request.

19. The storage system of claim 17, wherein the controller is further configured to:

in response to ascertaining that the copy of the particular unit of data present on the NVRAM cache device is in the non-updated state, determining at least one of: an access intensity of the copy of the particular unit of data present on the NVRAM cache device, or a ranking importance of the copy of the particular unit of data present on the NVRAM cache device; and delete, and without writing to the persistent storage device, the copy of the particular unit of data present on the NVRAM cache device in response to determining that the access intensity of the copy of the particular unit of data present on the NVRAM cache device is within an access threshold or the ranking importance of the copy of the particular unit of data present on the NVRAM is below an importance threshold.

20. The storage system of claim 17, wherein the controller is further configured to: delete, and without writing to the persistent storage device, the copy of the particular unit of data present on the NVRAM cache device in response to receiving the garbage collection request.

21. The storage system of claim 20, wherein the garbage collection request is generated by one of: a write request from the host computing device when the NVRAM cache device does not have sufficient capacity to accommodate the write request, or a back-ground garbage collection process.

22. A NVRAM-based storage subsystem comprising:

a persistent storage device; and a NVRAM cache device in communication with the persistent storage device, the NVRAM cache device comprises:

flash memory media; and a controller means for:

accessing a direct mapping between a logical address associated with data stored on the persistent storage device and a physical address on the NVRAM cache device, wherein logical address is directed to a logical address space and the physical address is directed to a physical address space, wherein the logical address space is larger than the physical address space, wherein the direct mapping is from the logical address space into the physical address space, wherein the logical address is indexed by at least 32 bits, wherein the mapping from the logical address space to the physical address space comprises an association map based on a hash, and wherein the hash is keyed to the logical address and is configured to equalize probabilities of mapping a keyed logical address to physical addresses within the physical address space;

receiving, from the host computing device, a request to access a particular unit of data stored on the persistent storage device;

using the direct mapping as a basis between the logical address associated with the data stored on the persistent storage device and the physical address on the NVRAM cache device to determine whether the particular unit of data being requested is present on the NVRAM cache device;

in response to determining that the particular unit of data being requested is present on the NVRAM cache device, servicing the request by accessing a copy of the particular unit of data present on the NVRAM cache device; and in response to determining that the particular unit of data being requested is not present on the NVRAM cache device, servicing the request by accessing the data stored on the persistent storage device.

* * * * *